United States Patent
Song et al.

(10) Patent No.: US 9,372,545 B2
(45) Date of Patent: Jun. 21, 2016

(54) MOBILE TERMINAL AND METHOD OF CONTROLLING THEREFOR

(71) Applicant: LG ELECTRONICS INC., Seoul (KR)

(72) Inventors: Yoomee Song, Seoul (KR); Jiyoun Lee, Seoul (KR); Younghoon Song, Seouk (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/459,049

(22) Filed: Aug. 13, 2014

(65) Prior Publication Data

US 2015/0084855 A1 Mar. 26, 2015

(30) Foreign Application Priority Data

Sep. 23, 2013 (KR) ........................ 10-2013-0112892

(51) Int. Cl.
*G06F 3/01* (2006.01)
*G02B 27/01* (2006.01)
*G06F 1/16* (2006.01)
*G06F 3/03* (2006.01)

(52) U.S. Cl.
CPC .............. *G06F 3/017* (2013.01); *G02B 27/017* (2013.01); *G06F 1/163* (2013.01); *G06F 3/013* (2013.01); *G06F 3/0304* (2013.01); *G02B 2027/014* (2013.01); *G02B 2027/0138* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 8,228,315 | B1* | 7/2012 | Starner | G02B 27/017 345/175 |
| 8,471,868 | B1* | 6/2013 | Wilson | G06F 3/017 345/156 |
| 8,558,759 | B1* | 10/2013 | Prada Gomez | G06F 3/017 345/156 |
| 2004/0196400 | A1* | 10/2004 | Stavely | G06F 3/017 348/333.01 |
| 2012/0068914 | A1 | 3/2012 | Jacobsen et al. | |
| 2012/0242698 | A1* | 9/2012 | Haddick | G02B 27/0093 345/633 |
| 2013/0128364 | A1 | 5/2013 | Wheeler et al. | |
| 2014/0232637 | A1* | 8/2014 | Park | G02B 27/017 345/156 |
| 2015/0177864 | A1* | 6/2015 | Wong | G06F 3/042 345/175 |

FOREIGN PATENT DOCUMENTS

EP 2631777 A1 8/2013

* cited by examiner

*Primary Examiner* — Joseph Haley
*Assistant Examiner* — Emily Frank
(74) *Attorney, Agent, or Firm* — Birch, Stewart, Kolasch & Birch, LLP

(57) ABSTRACT

The present invention relates to a wearable mobile terminal of a glasses form enabling a user to more conveniently use the terminal and a method of controlling therefor. According to at least one of embodiments of the present invention, various functions of the wearable mobile terminal can be executed based on a simple and easy gesture of the user.

22 Claims, 29 Drawing Sheets

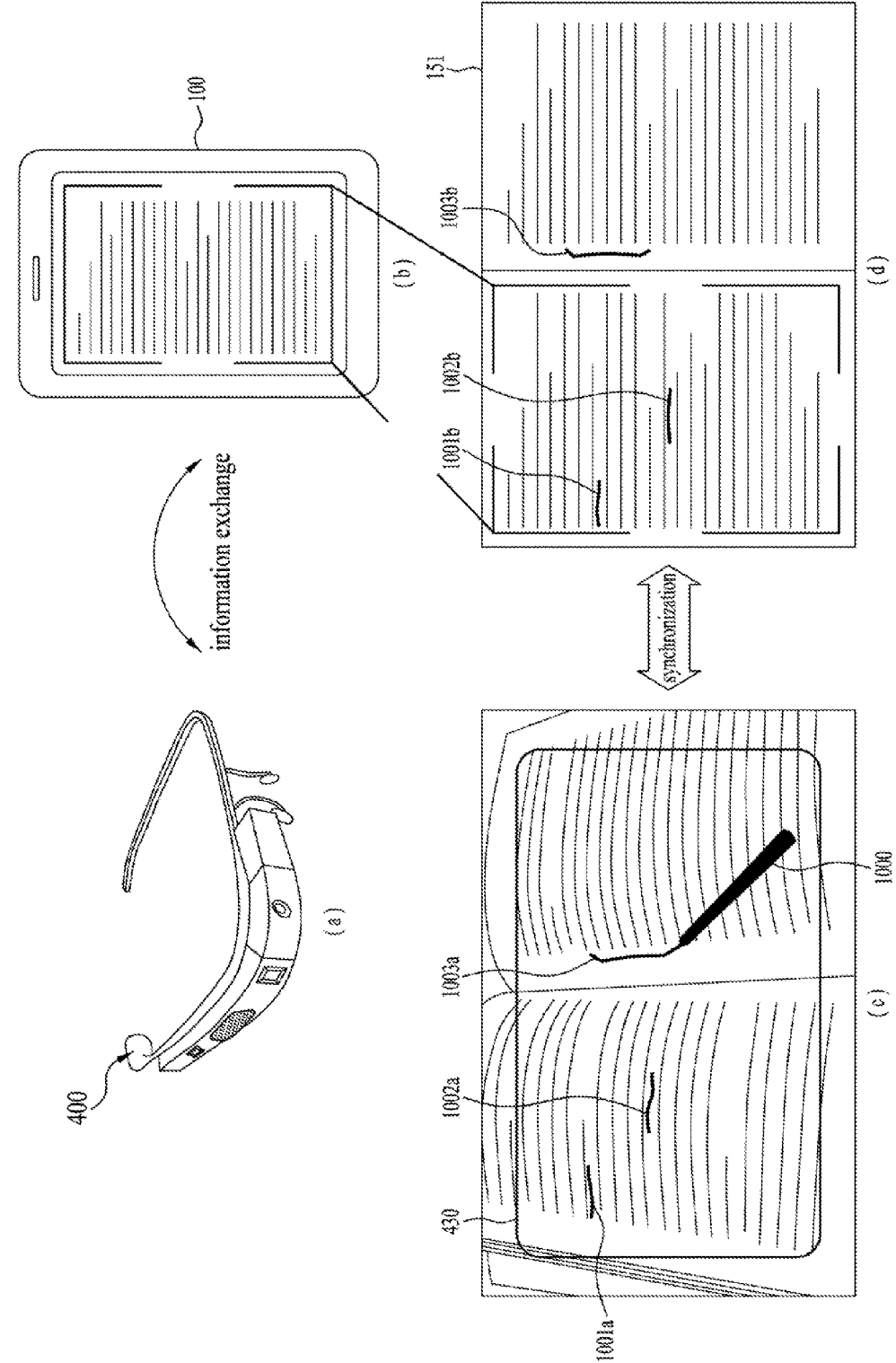

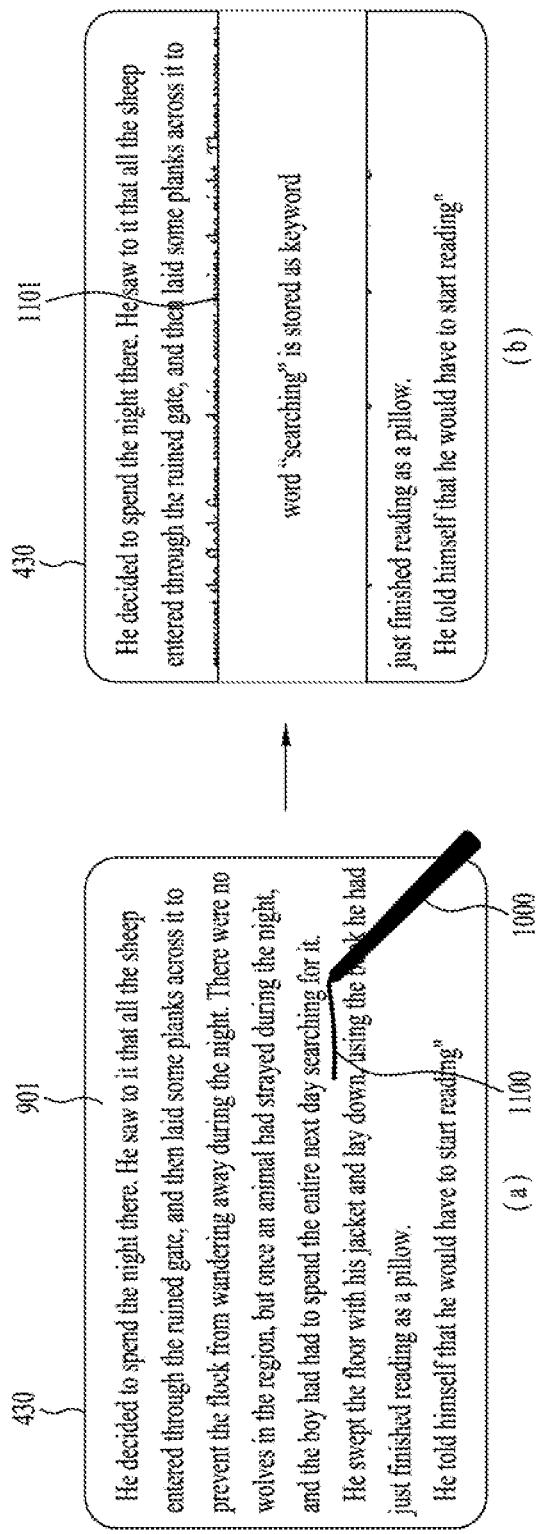

FIG. 18
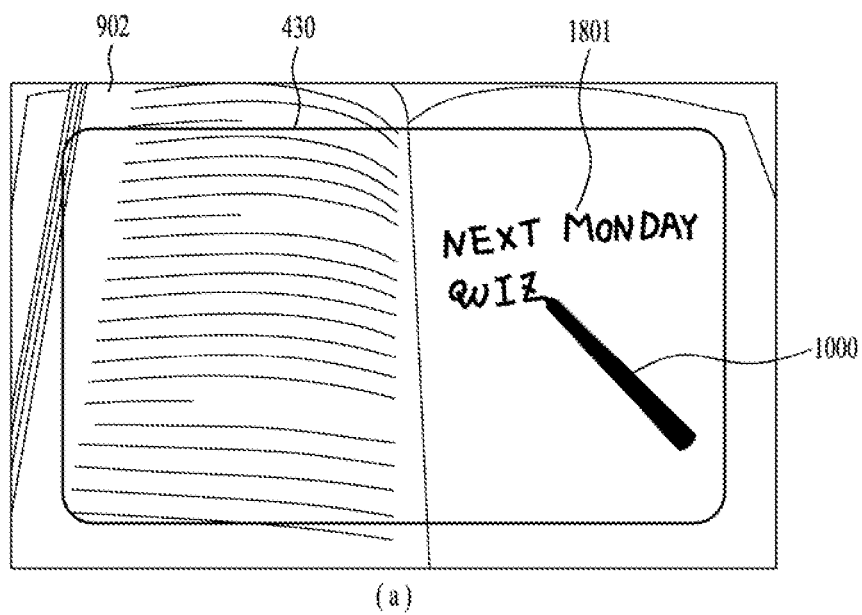
(a)
if no input is inputted for more than prescribed time
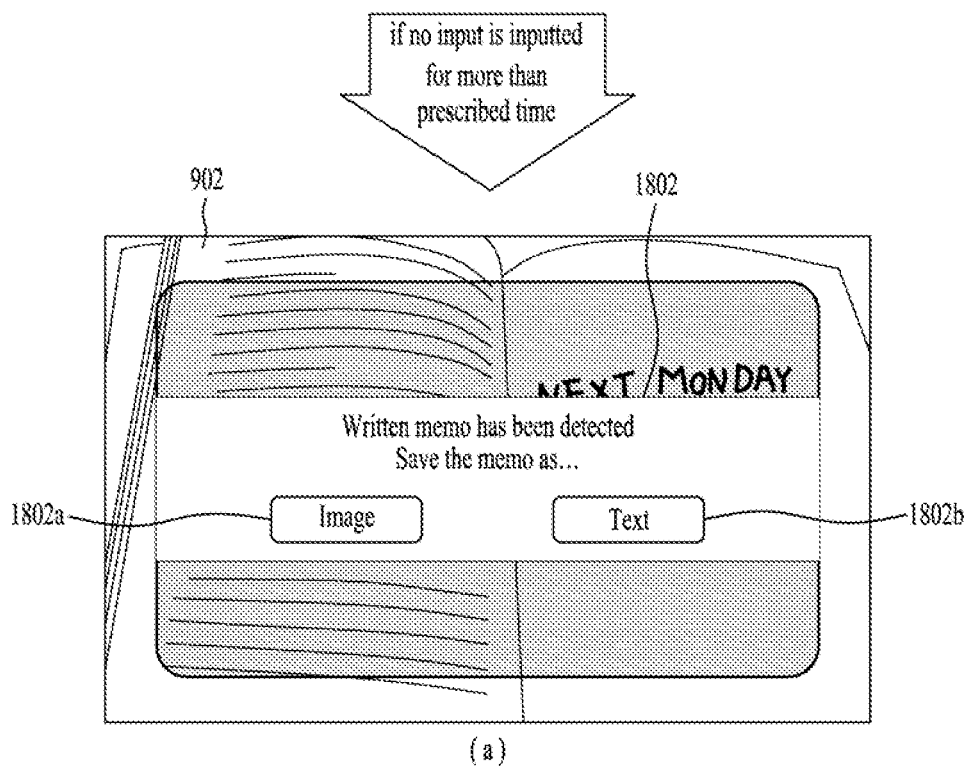
(a)

FIG. 19
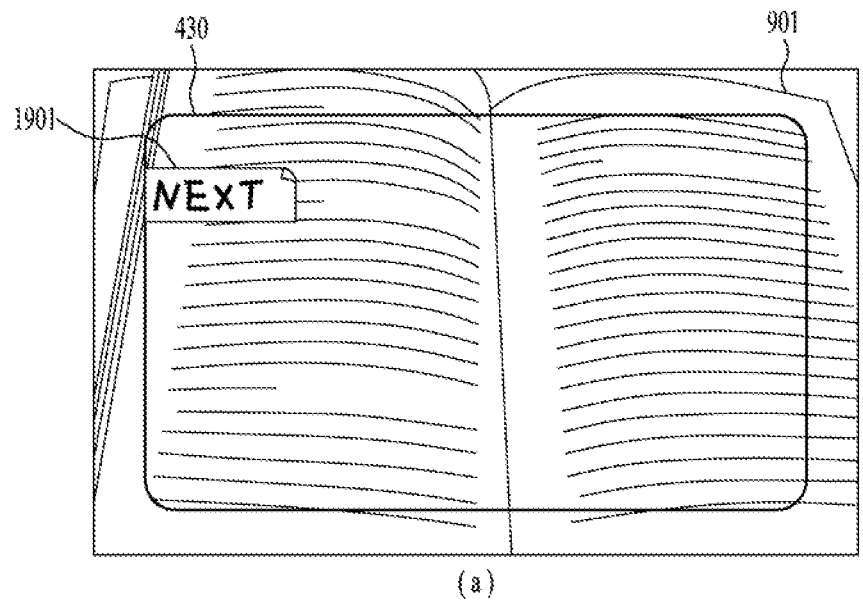
(a)
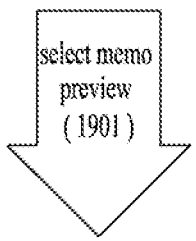
select memo
preview
(1901)
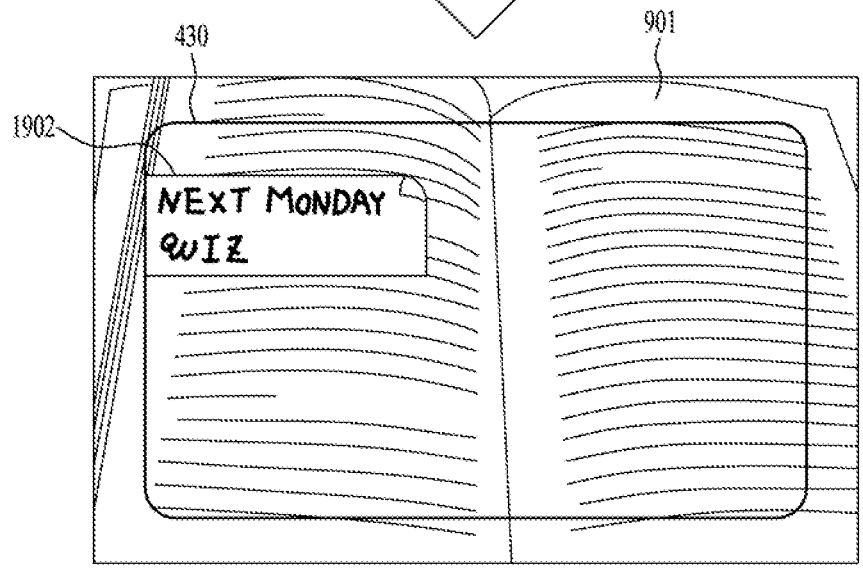
(b)

FIG. 20
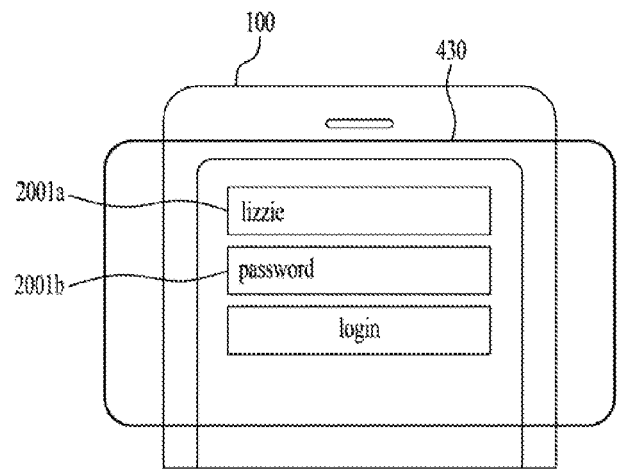
(a)
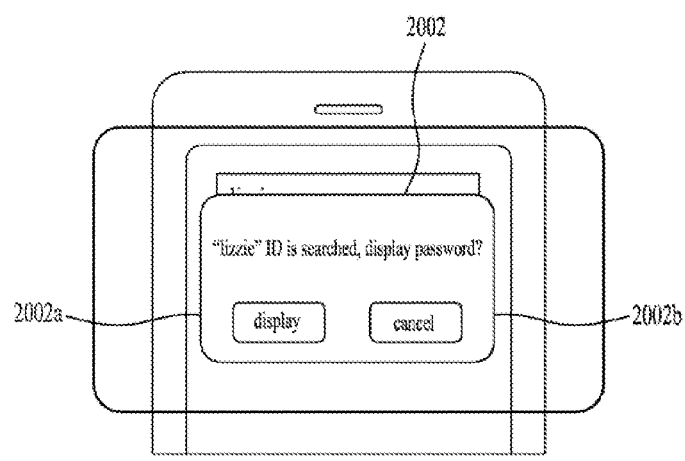
(b)
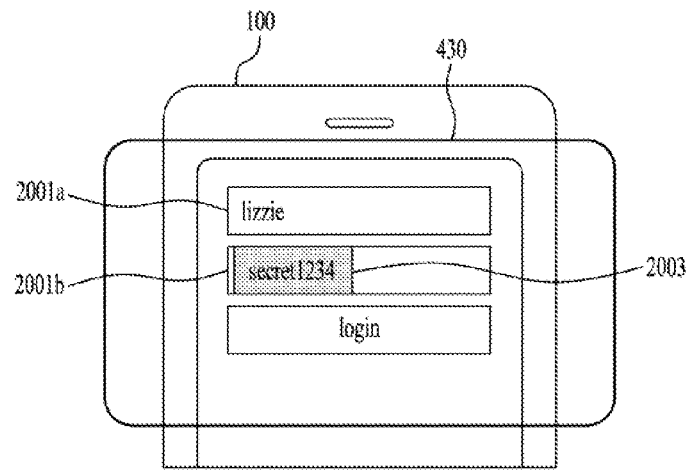
(c)

FIG. 21
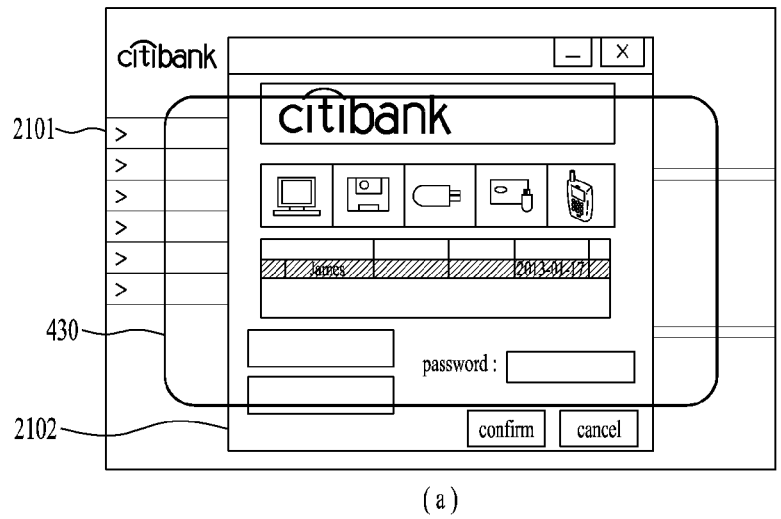
(a)
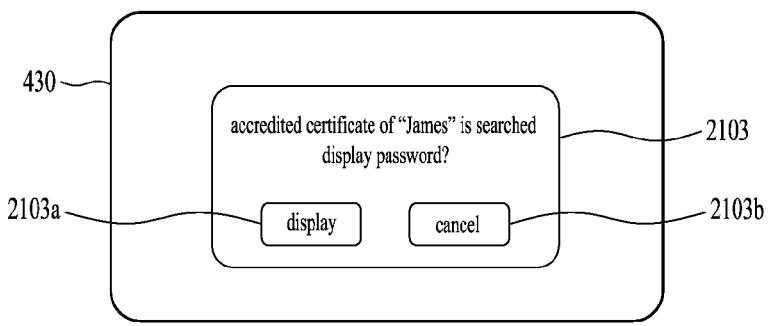
(b)
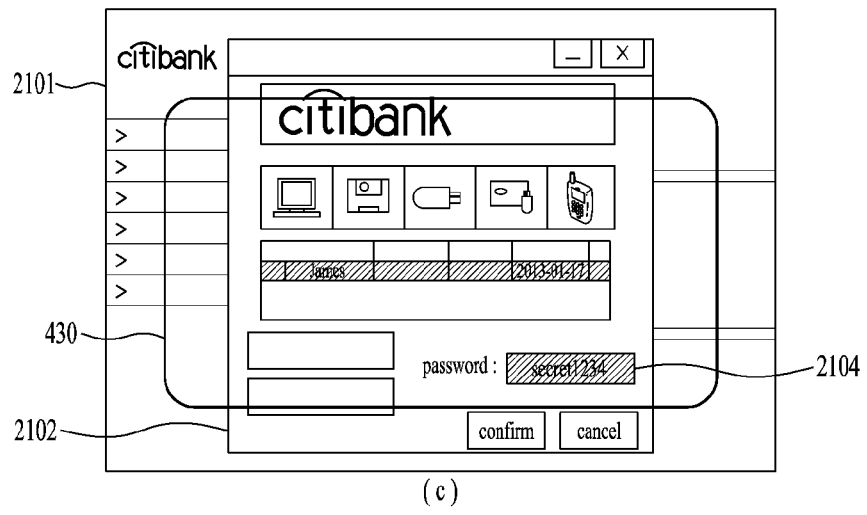
(c)

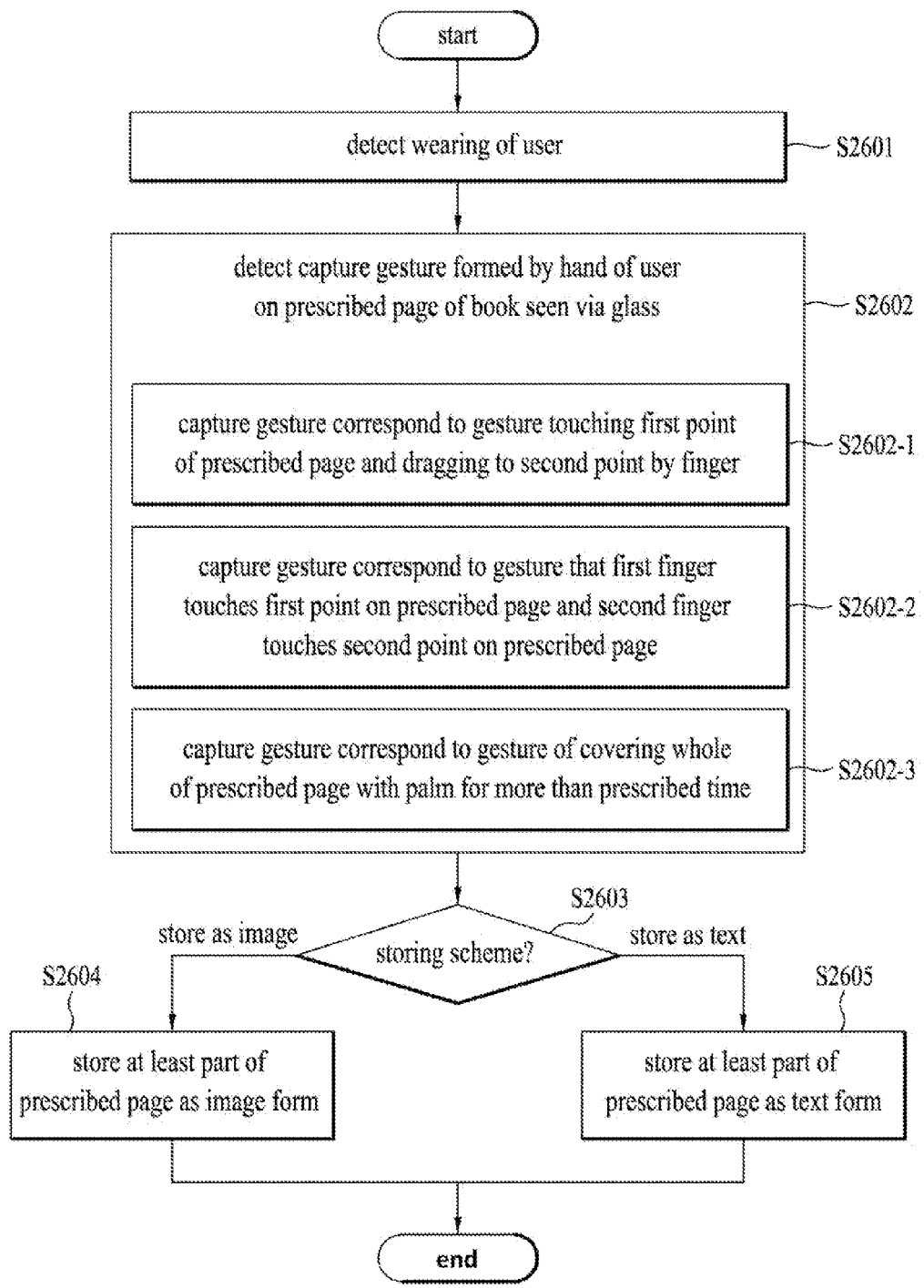

MOBILE TERMINAL AND METHOD OF CONTROLLING THEREFOR

Pursuant to 35 U.S.C. §119(a), this application claims the benefit of earlier filing date and right of priority to Korean Application No. 10-2013-0112892, filed on Sep. 23, 2013, the contents of which are hereby incorporated by reference herein in their entirety.

BACKGROUND OF THE INVENTION

1. Field of the Invention

The present invention relates to a mobile terminal enabling a user to more conveniently use the terminal and a method of controlling therefor.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

In general, a user of a terminal moves around while carrying the terminal in a bag, a pocket or the like and holds the terminal by a hand when the user needs to operate the terminal. While the terminal is held by a hand, the user can perform an operation on the terminal by the hand holding the terminal or the other hand.

Recently, inconvenience of operating a terminal is pointed out. In particular, it is a fair fact that if a hand or both hands are not free (in case of carrying an object by hands or in case of exercising/driving and the like), operating the terminal is inconvenience. Hence, a study on a new way of operating the terminal is under discussion. The study is focusing on a mobile terminal capable of being worn on a body of a person. This sort of terminal is called a wearable device (or wearable computer). Representative examples of the wearable device include a terminal of a watch form and a terminal of a glasses form.

Since those kinds of wearable devices are always worn on a part of a body of a user, there exists a merit in terms of mobility. On the contrary, since there exist a relatively small display and a limitation of a user input means, operation of the wearable devices may cause inconvenience.

Hence, it is necessary to perform a study on a wearable device enhancing user convenience in a manner of reducing inconvenience of operating the wearable devices and a method of controlling therefor.

SUMMARY OF THE INVENTION

Accordingly, the present invention is directed to an apparatus and method thereof that substantially obviate one or more problems due to limitations and disadvantages of the related art.

The present invention is proposed to satisfy the aforementioned necessity. One object of the present invention is to provide a mobile terminal enhancing user convenience in case of operating wearable mobile terminals and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a wearable mobile terminal includes a frame configured to be worn on a head of a user, a sensing unit configured to detect a hand gesture of the user, a camera configured to face a gaze direction of the user in case of being worn on the user and if a prescribed gesture for a prescribed target is detected via the sensing unit, a controller configured to control the camera to take a picture of a capture image for the prescribed target.

To further achieve these objects and other advantages and in accordance with the purpose of the invention, as embodied and broadly described herein, according to one embodiment, a method of controlling a wearable mobile terminal, which is equipped with a frame configured to be worn on a head of a user, a camera configured to face a gaze direction of the user in case of wearing the wearable device and a memory, includes the steps of detecting a hand gesture of the user via a sensing unit and if a prescribed gesture for a prescribed target is detected, controlling the camera to take a picture of a capture image for the prescribed target.

It is to be understood that both the foregoing general description and the following detailed description of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIGS. 10a to 10d are diagrams for examples of performing synchronization between a wearable device 400 and a mobile terminal 100 according to one embodiment of the present invention;

FIG. 11 is a diagram for a method of storing a prescribed word as a keyword based on a pen gesture detected by a user according to one embodiment of the present invention;

FIG. 18 is a diagram for a method of storing a writing content as a memo according to one embodiment of the present invention;

FIG. 19 is a diagram showing a state of reading a memo stored in FIG. 18;

FIG. 20 and FIG. 21 are diagrams for a controlling method of automatically searching for a password and displaying the password for a user according to one embodiment of the present invention;

FIG. 26 is a flowchart for a method of capturing a screen in response to detection of a prescribed gesture according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
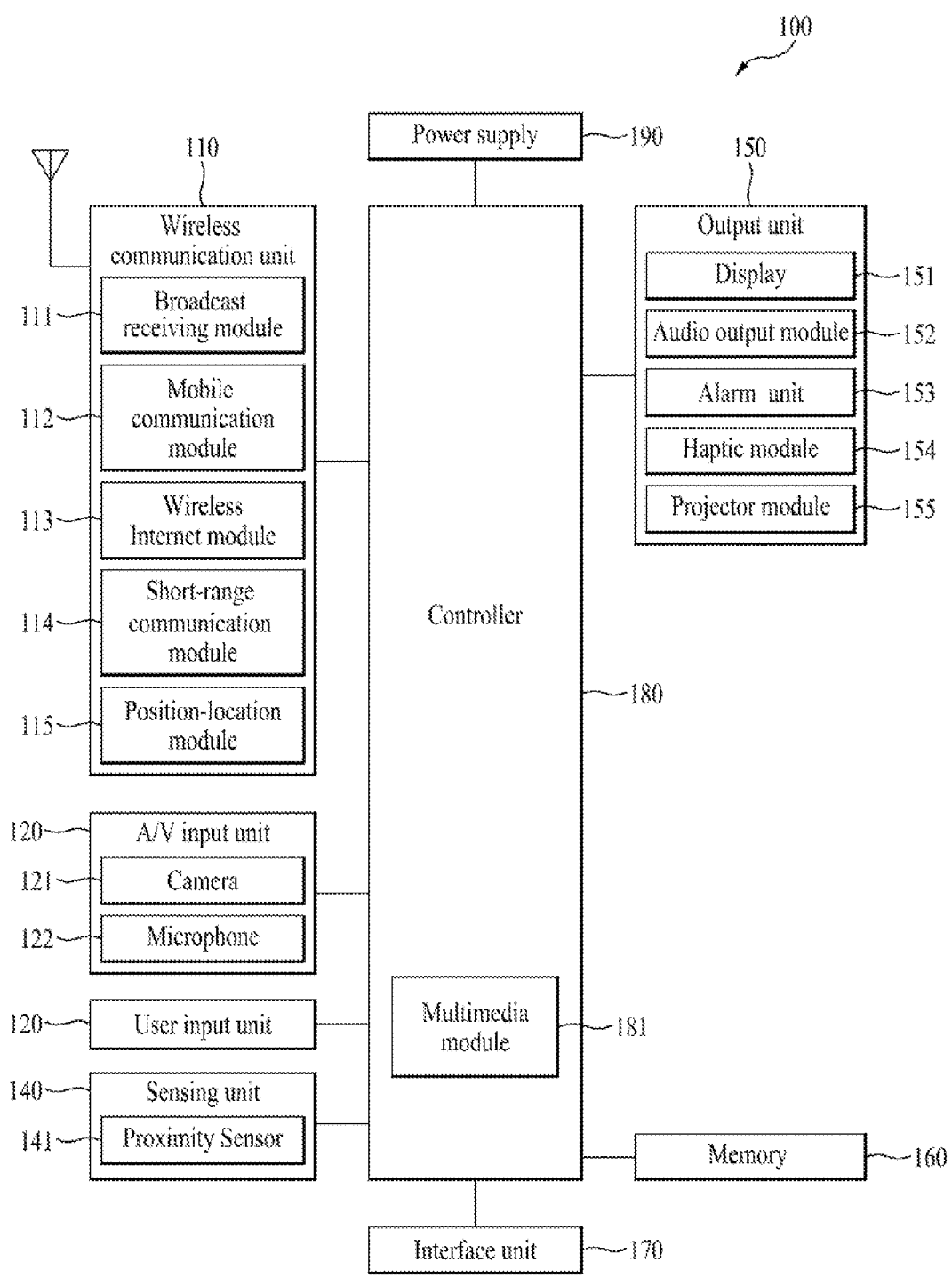
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Gobal System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access). GSM, CDMA, WCDMA, LTE (Long Term Evolution) etc.

Wireless internet access by Wibro, HSDPA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
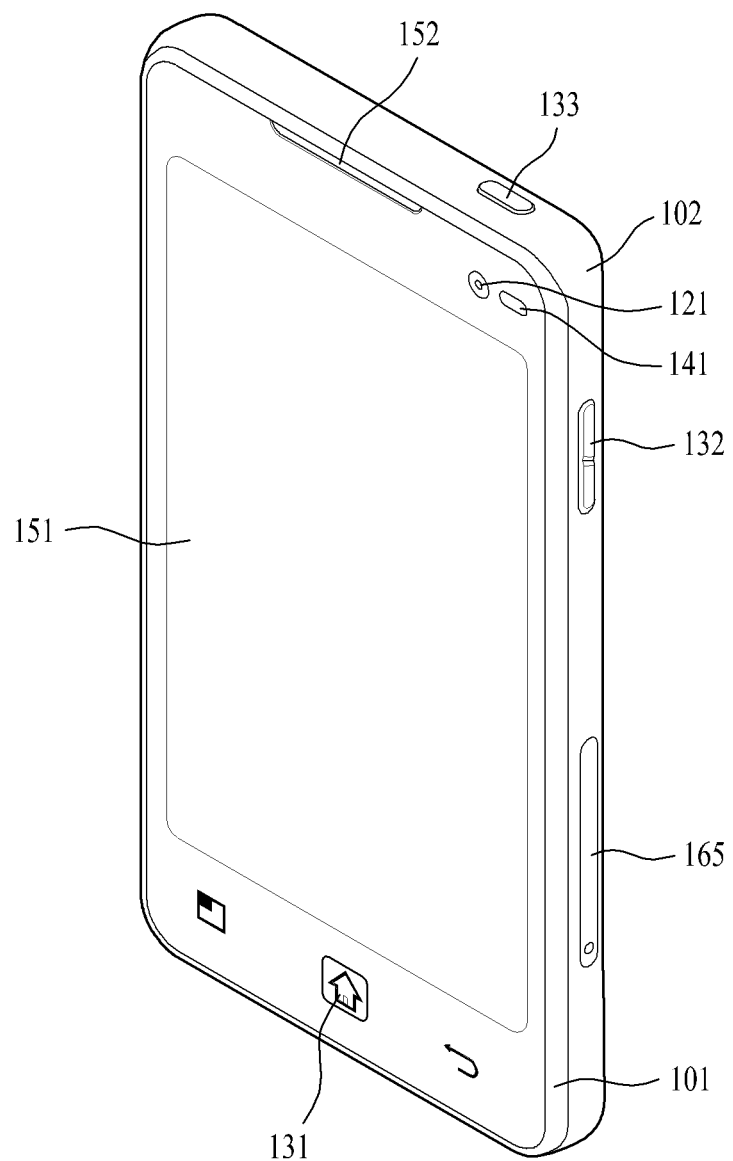
FIG. 2 is a front perspective diagram for one example of a mobile or portable terminal according to the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
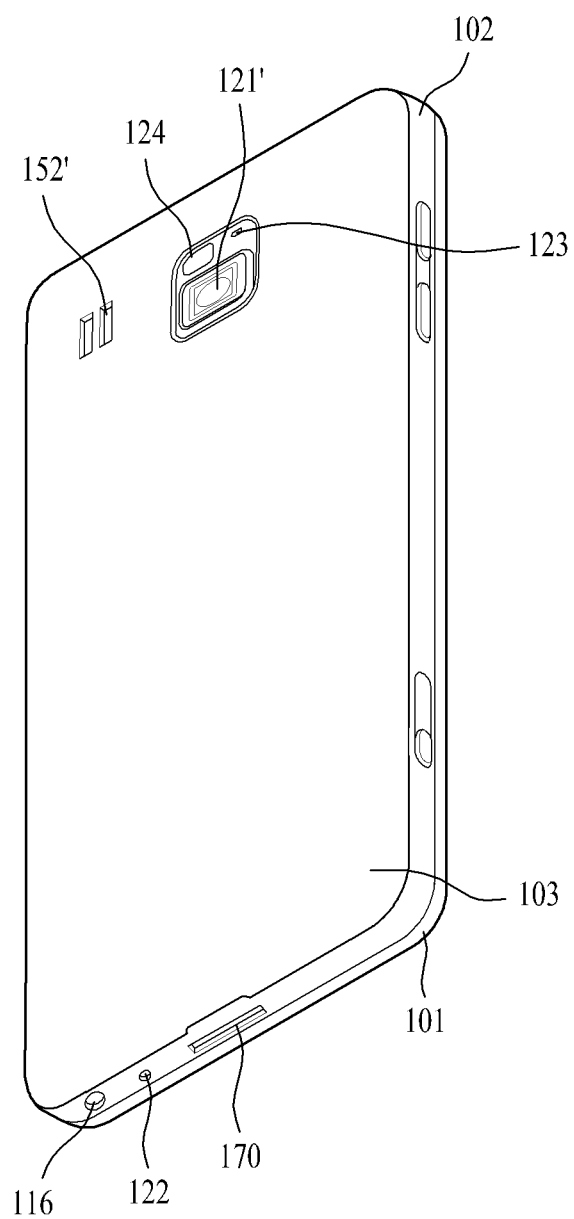
FIG. 3 is a rear perspective diagram of the mobile terminal shown in FIG. 2.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
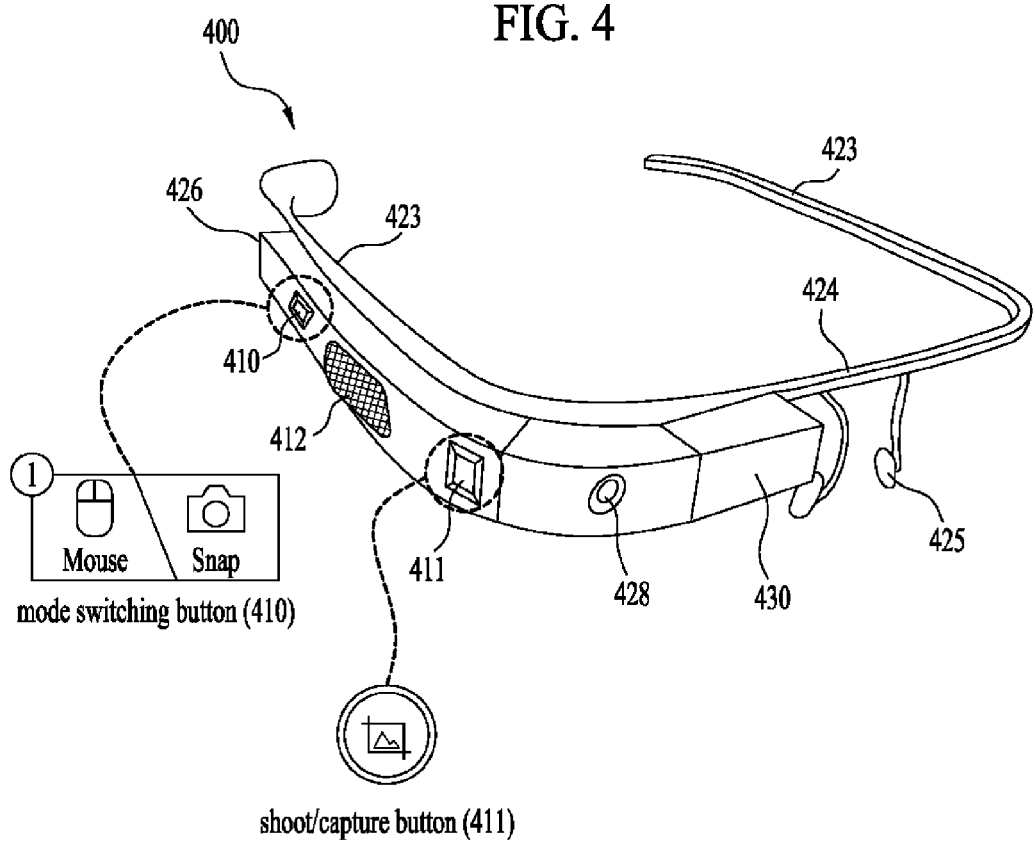
FIG. 4 is a front perspective diagram for one example of a wearable device 400 of a glasses form according to one embodiment of the present invention.

FIG. 4 is a rear perspective diagram of a surface of a rear case exposed by separating a rear cover of a mobile terminal according to one embodiment of the present invention.

Referring to FIG. 4, a front case 101, a rear case 102, a rear cover (or a battery cover) 103, a camera 121', an interface unit 170, a microphone 122, a speaker module 154, an audio output unit 152', a battery 191, a battery loading unit 104, a USIM card loading unit 166, and a memory card loading unit 167 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse, the battery 191 can be configured as a replaceable type, as shown in FIG. 4, to complement a considerable amount of power consumption. In case that the replaceable type is adopted, the battery loading unit 104 is formed on the surface of the rear case 102 to enable a user to detach the corresponding battery. In this case, a contact terminal is provided to the battery loading unit 104 to be electrically connected to a part installed within the case.

The USIM card loading unit 166 or the memory card loading unit 167 may be provided, as shown in FIG. 4, next to the battery loading unit 104. Alternatively, the USIM card loading unit 166 or the memory card loading unit 167 may be provided to a bottom surface of the battery loading unit 104. Hence, the battery 191 can be externally exposed if the battery 191 is unloaded from the battery loading unit 104. In this case, since a size of the battery loading unit 104 is extensible, the battery 191 can be oversized.

Although FIG. 4 shows the configuration that the USIM card loading unit 166 or the memory card loading unit 167 is mounted on a backside of the rear case 102, it can be inserted in or separated from the mobile terminal 100 in a manner of being inserted in a lateral side of the rear case 102.

The rear cover 103 covers the surface of the rear case 102. Hence, the rear cover 103 can fix the battery, 191, the USIM card, the memory card and the lime not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure. Hence, when rear case 102 and the rear cover 103 are connected to each other, the waterproof structure can seal up the gap between the rear case 102 and the rear cover 103.

FIG. 4 is a front perspective diagram for one example of a wearable device 400 of a glasses form according to one embodiment of the present invention.

A wearable device 400 can include temples 423, a center bridge 424 and nose pads 425. In an example of FIG. 4, the center bridge 424 is connected with the temples 423. The wearable device 400 of a glasses form shown in FIG. 4 may not include a lens and a lens frame to support the lens.

A computing system 426 is shown as to be positioned over the temples 423 and the center bridge 434 of the wearable device 400, by which the present invention may be non-limited. The computing system 426 corresponds to a main body of a mobile terminal 100 in general. As mentioned in the foregoing description with reference to FIG. 1, the computing system can include various devices/modules.

FIG. 4 shows the camera 428 positioned at the front of the computer system 426. Although the camera 428 is identical to the camera 121 mentioned earlier with reference to FIG. 1, a different identification code is used to emphasize that the camera 428 corresponds to a camera positioned at the front of the wearable device 400. The camera 428 may be positioned at a different part of the wearable device 400. The camera 428 is configured to capture an image including various image quality and frame rates. In particular, the camera 428 can be used to obtain an image identical to a vision at which a user is watching in a manner of being installed in the front of the wearable device 400.

According to what is shown in FIG. 4, the transparent display 430 is shown to be positioned at the center bridge 434 part as a head mounted display (HMD) form. The HMD form indicates a display form capable of directly proposing an image in front of eyes of a user in a manner of being mounted on a head of the user. In particular, when the user wears the wearable device 400, the transparent display can be positioned at the center bridge part 434 to make the transparent display face the eyes of the user in order to directly provide an image to the eyes of the user.

An output image outputted via the transparent display 430 is outputted in a manner of being overlapped with a vision (hereinafter called a normal vision) of a user watching an object in everyday life. In particular, the wearable device 400 can provide an augmented reality (AR) using the transparent display 430. The augmented reality is a technology used for showing one image in a manner of overlapping a 3D image with a real image or a background. Since the technology used for implementing the augmented reality is a well-known technology, detailed explanation for the technology is omitted at this time.

A material of the transparent display 430 used for outputting an image by overlapping a normal vision with an outputted image can be classified into a transparent material and an opaque material.

Since the transparent display 430 according to one embodiment of the present invention is manufactured by a transparent material, a penetration image penetrating the transparent display 430 and an output image outputted from the transparent display 430 can be seen to a user in a manner of being overlapped with each other.

According to a different embodiment of the present invention, an opaque transparent display 430 can be installed in the wearable device 400. In this case, an image provided by the transparent display 430 is provided to one of two eyes of the user and a vision of a normal object can be provided to another eye of the user.

According to a further different embodiment of the present invention, an opaque transparent display 430 can be installed in the wearable device 400. In this case, the wearable device can provide augmented reality including a background of an image received via the camera 428 to a user.

The wearable device 400 according to one embodiment of the present invention may further include an eye tracking sensor. The eye tracking sensor indicates a sensor capable of detecting a direction at which eyes of a user are facing, movement of the eyes and/or a position of the eyes. The computing system 426 can determine a direction at which a gaze of the user is facing based on the direction at which the eyes are facing detected by the eye tracking sensor. If the wearable device 400 is mounted on the user, the eye tracking sensor can be arranged to face the eyes of the user.

According to an example of FIG. 4, the computing system 426 can include user input units 410/411/412 configured to receive an input from a user. The user input units 410/411/412 are provided for a controlling method according to one embodiment of the present invention. The user input units 410/411/412 consists of a physical button or a touch pad, by which the present invention may be non-limited. The user input units detect an input of a user selecting (touching) using a finger and can deliver the input to the controller 180. The user input units 410/411/412 can include a drag pad 412. The drag pad 412 is an input module enabling a user to execute a prescribed function of the wearable device 400 (or a different external device connected with the wearable device 400) based on a touch. The drag pad 412 can be installed in one or both of the temples 423 configured by two. The drag pad senses a position of a finger or movement of the finger of a user and can deliver a sensed result to the computing system 426. For instance, the drag pad 412 detects whether the finger of the user is dragged to a gaze direction of the user or an opposite direction of the gaze direction and can deliver a detected result to the computing system 426.

In the following, a controlling method capable of being implemented in a mobile terminal and relevant embodiments are explained with reference to attached drawings.

According to at least one embodiment of the present invention to be explained in the following detail explanation, when a user is reading a book in a manner of wearing the wearable device 400 on a head of the user, a controlling method of the wearable device 400 capable of enhancing user convenience is proposed. When the wearable device 400 is mounted on the user, the wearable device 400 can provide augmented reality to the user. In particular, the augmented reality can identify not only a language of a book read by the user but also text content, picture content and/or writing content included in the book. And, the augmented reality can be provided based on the identified result. Regarding a method of specifically applying the augmented reality, it shall be described later with reference to the attached drawings in the following.

In the drawing used for explaining embodiments of the present invention, assume a case that the transparent display 430 is transparent for example. Moreover, the drawing shows not only a state of the transparent display 430 but also a background penetrating the transparent display 430 in a state that the wearable device 400 of a glasses form mentioned earlier with reference to FIG. 4 is mounted on a head of the user.

Figure 5:
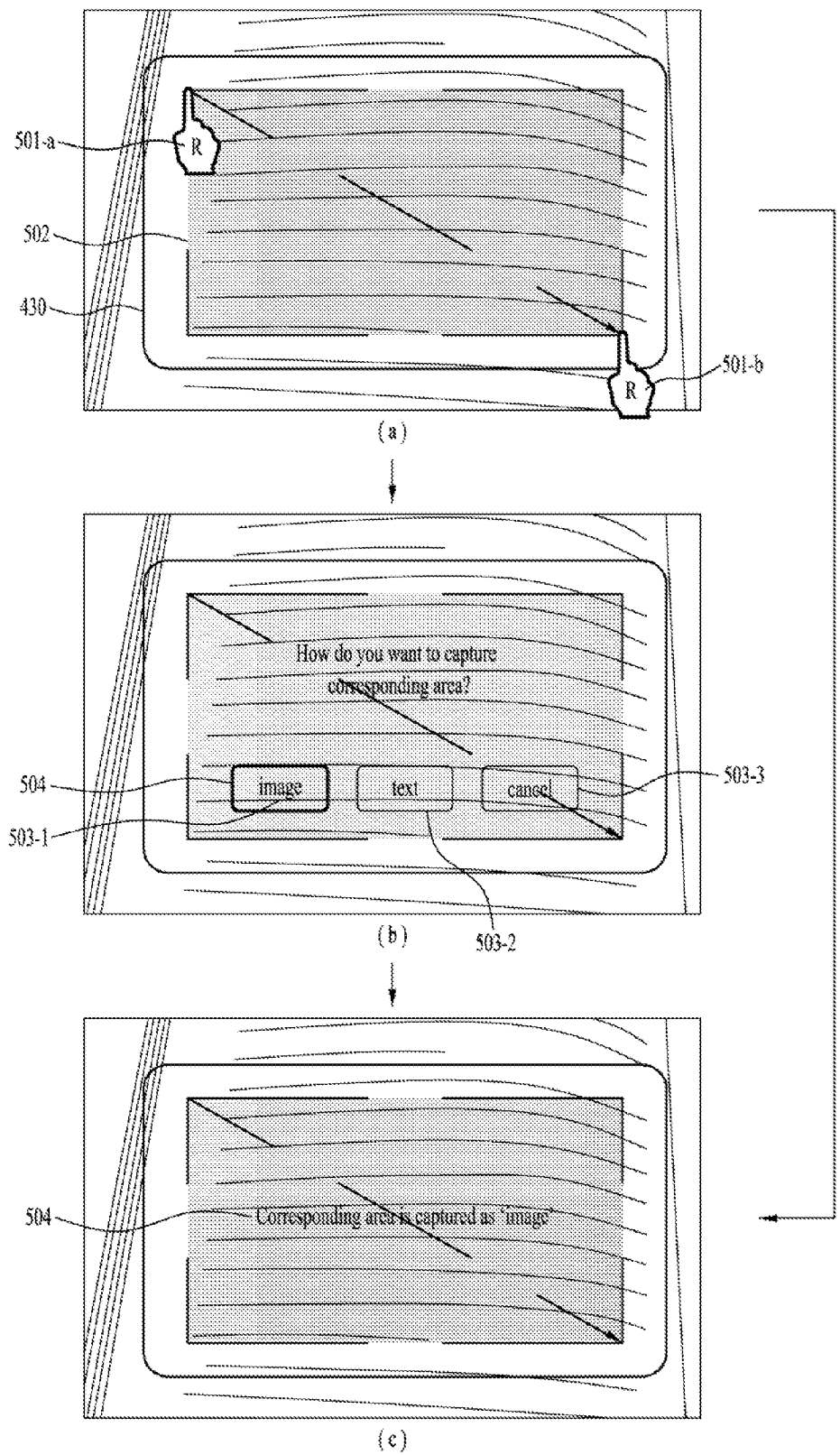
FIGS. 5 to 7 are diagrams for examples of a method of performing a capturing operation in response to a hand gesture performed by a user on a prescribed page of a book according to one embodiment of the present invention.
Figure 6:
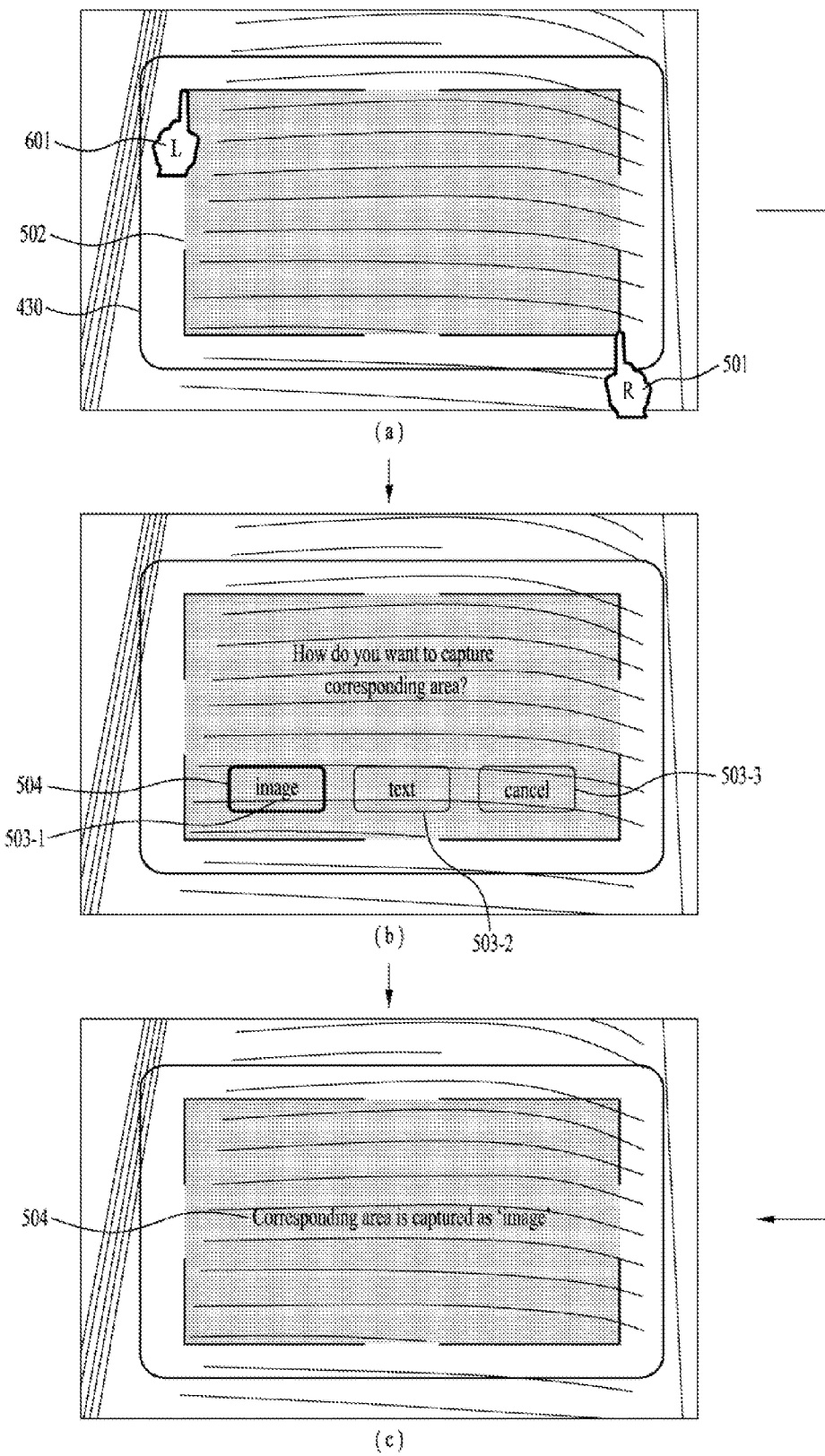
Figure 7:
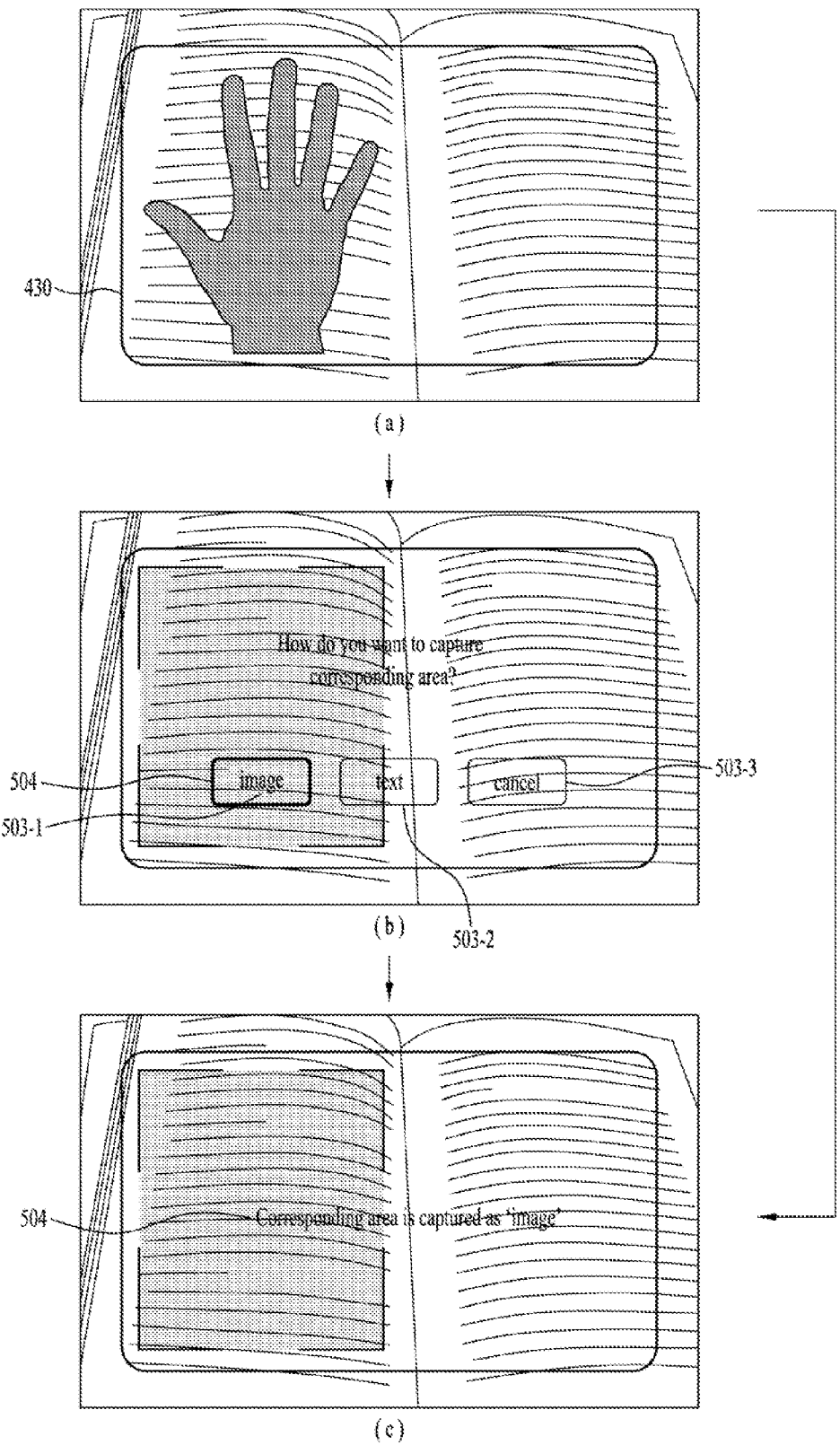

FIGS. 5 to 7 are diagrams for examples of a method of performing a capturing operation in response to a hand gesture performed by a user on a prescribed page of a book according to one embodiment of the present invention. Although one embodiment of the present invention is explained based on an example of a book, one embodiment of the present invention can be identically applied to an object (not limited to a paper) including a printed text.

Referring to FIG. 5 (a), a gesture (hereinafter first gesture) is performed in a manner that a user touches a first point (a point at which an index finger of a hand 501-a is pointing) on a prescribed page using a finger 501 (an index finger of a right hand in case of an example of FIG. 5) and drags it to a second point (a point at which an index finger of a hand 501-b is pointing). If the first gesture is inputted, the wearable device 400 can capture at least one area of the prescribed page.

In embodiment of the present invention, capturing indicates that a user stores a vision seen from penetrating the transparent display 430 as an image. In particular, the wearable device 400 can perform the aforementioned capturing operation in a manner of taking a picture of an image using the camera 428 facing a direction identical to a vision of the user and storing the image. In particular, in order for the user to obtain the vision seen from penetrating the transparent display 430 as an image, the user can take a picture of the image using the camera 428 facing the direction identical to the direction of the vision of the user.

In one embodiment of the present invention, one area of the prescribed page may correspond to a rectangle 502 including a diagonal that corresponds to a line crossing the first point and the second point.

As depicted in FIG. 6 (c), if a capture image obtained by a capturing operation is stored, the controller 180 can output a guide phrase 504 indicating that the capturing operation has been performed.

In case of detecting a gesture by the wearable device 400 according to one embodiment of the present invention, the wearable device can analyze an image taken by the camera 428. In particular, the controller 180 of the wearable device 400 analyzes the images received via the camera 428 (in real time) with a prescribed interval and can detect whether a hand of a user makes a gesture in a manner of performing the analysis. In case of detecting a gesture by the wearable device 400 according to a different embodiment of the present invention, the wearable device can use the sensing unit 140. Meanwhile, the method of detecting a gesture may be non-limited by the aforementioned methods. An alternative method of detecting a gesture of a user may be applied to one embodiment of the present invention. The aforementioned methods can be applied to not only a method of detecting a hand gesture of a user but also a method of detecting a pen gesture in detailed explanation used for explaining embodiments of the present invention in the following. Regarding the pen gesture, it shall be described in detail with reference to relevant drawing in the following.

Meanwhile, the aforementioned gesture needs to be precisely recognized. This is because if there exists a hand operation unintended by a user, the hand operation should not be recognized as a prescribed command. Hence, it is necessary to explain the first gesture in more detail. As depicted in FIG. 5 (a), the first gesture according to one embodiment of the present invention may correspond to an input inputted by an index finger pointing at a first point for more than a prescribed time while remaining fingers except the index finger are folded and then dragging the index finger to a second point. In addition, the first gesture may correspond to a gesture in which a distance of dragging from the first point to the second point is greater than a prescribed distance. In particular, if the dragging distance is less than the prescribed distance, the controller 180 may not recognize the drag as the first gesture. In particular, the controller can perform the capturing operation when the controller 180 detects a specified first gesture.

Moreover, according to one embodiment of the present invention, a captured image can be stored by one selected data type among two data types including an image data type and a text data type according to a selection of a user (or a predetermined selection). In particular, if the first gesture is detected, the controller 180 can output a pop-up window to select a data type used for storing a prescribed area (refer to FIG. 5 (*b*)). The outputted pop-up window includes one or more selection icons 503-1 to 503-3. If a user selects one of the selection icons 503-1 to 503-3, the controller 180 can store the prescribed area by a data type corresponding to the icon selected from the selection icons 503-1 to 503-3.

If a prescribed area is stored by a predetermined data type instead of a user selection, the controller may directly output a guide phrase indicating a completion of a capture without outputting the pop-up window as depicted in FIG. 5 (*c*).

If an image selection icon 503-1 is selected, the controller 180 can store a captured image in the memory 160 in an image data form.

If a textualization selection icon 503-2 is selected, the controller 180 recognizes a text on a captured image and can store a recognized result in the memory 160 in a text data form.

Meanwhile, one embodiment of the present invention proposes to use a selection indicator 504 to select an icon. In general, it is not easy for the wearable device 400 of a glasses form to receive a user input. This is because it is difficult for the wearable device to use a touch screen corresponding to an input means of a general mobile terminal 100. The selection indicator 504 according to one embodiment of the present invention can be positioned at one of the aforementioned selection icons 503-1 to 503-3. A position of the selection indicator 504 can be scrolled between the selection icons 503-1 to 503-3 according to a user input. If a determination input of the user is received, the controller 180 can select an icon at which the selection indicator 504 is positioned among the selection icons 503-1 to 503-3. An input for scrolling the selection indicator 504 may correspond to an input dragging the drag pad 412 in a prescribed direction. And, the determination input may correspond to an input touching the drag pad 412.

According to one embodiment of the present invention, a user can select an icon from a plurality of selection icons using the selection indicator 504 displayed in the drawing in the following.

Referring to FIG. 6 (*a*), a user is making a gesture (hereinafter a second gesture) of touching a first point (a point at which an index finger of a hand 601 is pointing) and a second point (a point at which an index finger of a hand 501 is pointing) on a prescribed page using fingers of both hands (the index finger of a left hand 601 and the index finger of a right hand 501), respectively. If the second gesture is inputted, the wearable device 400 can capture at least one area of the prescribed page.

In one embodiment of the present invention, the one area of the prescribed page may correspond to a rectangular including a diagonal corresponding to a line crossing the first point and the second point.

In order to minimize misrecognition of the second gesture, it is necessary to explain the second gesture in more detail. Hence, as depicted in FIG. 6 (*a*), the second gesture may correspond to a gesture touching the first point (the point at which the index finger of the hand 601 is pointing) and the second point (the point at which the index finger of the hand 501 is pointing) on the prescribed page in a state that the index fingers of both hands are unfold and remaining fingers except the index fingers are folded. Moreover, the second gesture may correspond to a gesture maintaining the aforementioned touch for more than a prescribed time.

Similar to FIG. 5, in one embodiment of the present invention according to FIG. 6, a captured image can be stored by one selected data type among two data types including an image data type and a text data type according to a selection of a user (or a predetermined selection). In particular, if the first gesture is detected, the controller 180 can output a pop-up window to select a data type used for storing a prescribed area (refer to FIG. 5 (*b*)). The outputted pop-up window includes one or more selection icons 503-1 to 503-3. If a user selects one of the selection icons 503-1 to 503-3, the controller 180 can store the prescribed area by a data type corresponding to the icon selected from the selection icons 503-1 to 503-3.

Referring to FIG. 6 (*a*), a user is making a gesture (hereinafter a third gesture) of covering a prescribed page using a palm. If the third gesture is inputted, the wearable device 400 can capture at least one area (or a whole of the prescribed page) of the prescribed page.

Similar to the first and second gesture, it is necessary to explain the third gesture in more detail to reduce misrecognition. Specifically, the third gesture according to one embodiment of the present invention may correspond to a gesture of covering a prescribed page for more than a prescribed time using a palm. In particular, if a gesture is not inputted for more than the prescribed time, the controller 180 does not recognize the input as the third gesture and may not perform a capturing operation.

Similar to FIG. 5, in one embodiment of the present invention according to FIG. 7, a captured image can be stored by one selected data type among two data types including an image data type and a text data type according to a selection of a user (or a predetermined selection). In particular, if the first gesture is detected, the controller 180 can output a pop-up window to select a data type used for storing a prescribed area (refer to FIG. 5 (*b*)). The outputted pop-up window includes one or more selection icons 503-1 to 503-3. If a user selects one of the selection icons 503-1 to 503-3, the controller 180 can store the prescribed area by a data type corresponding to the icon selected from the selection icons 503-1 to 503-3.

Figure 8:
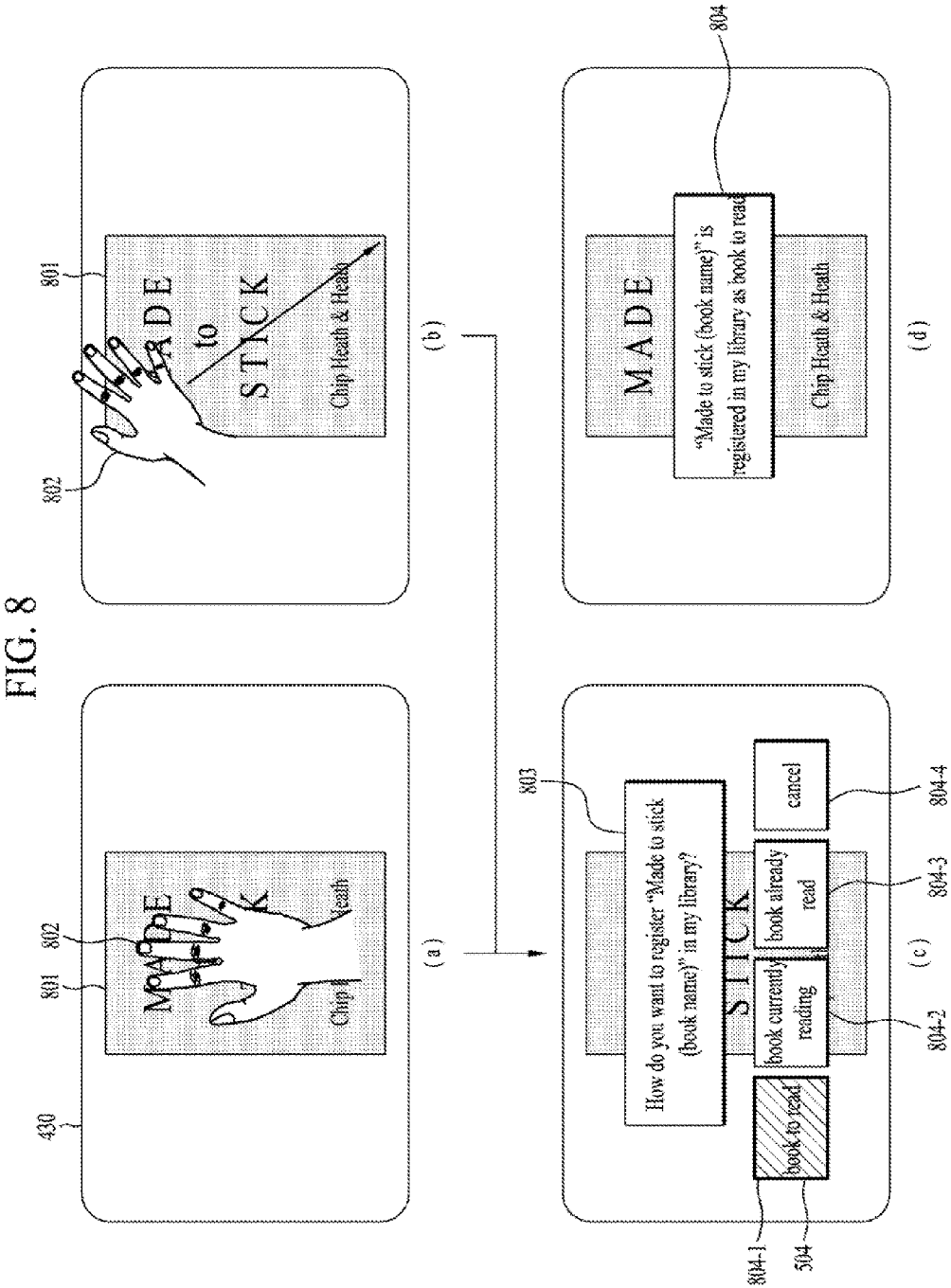
FIG. 8 is a diagram for one example of a method of registering a book in response to a hand gesture performed by a user on a cover of the book according to one embodiment of the present invention.

FIG. 8 is a diagram for one example of a method of registering a book in response to a hand gesture performed by a user on a cover of the book according to one embodiment of the present invention.

Referring to FIG. 8 (*a*), a user is making a gesture (hereinafter a fourth gesture) of covering a cover of a book using a palm. If the fourth gesture of the user is detected, the controller 180 can resister the book.

An operation of registering a book according to one embodiment of the present invention corresponds to an operation of storing a cover of the book (or a title of the book) in a prescribed form in order to enable a user to read the book again. The prescribed form can include at least one of an image form of the cover and a text form of the cover. Or, the prescribed form may correspond to a form of adding the cover of the book (or the title of the book) to a list of books on a prescribed application (e.g., Google books application) capable of managing the list of books.

In case of registering a book according to one embodiment of the present invention, one embodiment of the present invention proposes that the controller 180 receives a selection of at least one category and registers the book according to the selected category. In case that the controller registers books according to the category, when a user intends to read the registered books, the user can read the books registered according to the category.

If the fourth gesture is detected, the controller 180 can output a pop-up window to receive a selection of a category. In this case, the pop-up window can include selection icons 804-1 to 804-4 used for selecting the category. In an example of FIG. 8 (*c*), the category includes 'book to read', 'book currently reading' and 'book already read'. An input selecting one of the selection icons 804-1 to 804-4 can use the aforementioned selection indicator 504.

If a selection of a category is received from a user via the pop-up window, the controller 180 registers the book according to the selected category and can output a pop-up window 804 informing the user of the registration of the book.

Meanwhile, one embodiment of the present invention may be non-limited by the fourth gesture. Referring to FIG. 8 (*b*), a user is making a gesture (hereinafter a fifth gesture) of sweeping a cover of a book using a palm. If the fifth gesture of the user is detected, the controller 180 can register the book. The fifth gesture is explained in more detail. In particular, the fifth gesture may correspond to a gesture of covering the cover of the book using the palm for a prescribed time (e.g., about two seconds) and then sweeping the palm in a diagonal direction of the cover of the book.

In the embodiments explained so far, a book is registered using a cover of the book. In some cases, there may exist a mention on a title of a different book in a page of the book. One embodiment of the present invention proposes to register a book based on a title of a different book displayed in a page of the book. Regarding this, it shall be explained with reference to FIG. 9.

Figure 9:
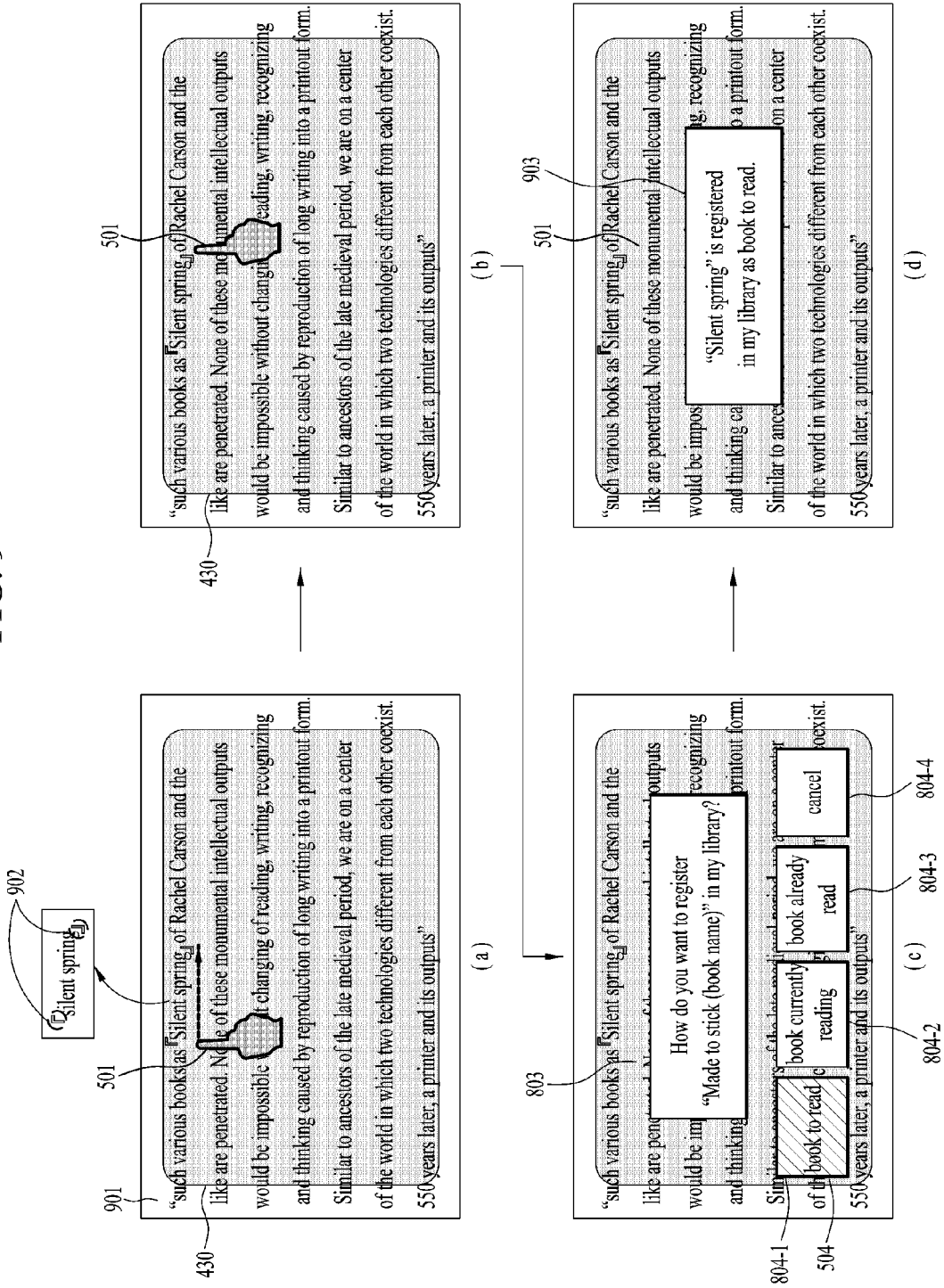
FIG. 9 is a diagram for one example of a method of registering a book based on a title of the book according to one embodiment of the present invention.

FIG. 9 is a diagram for one example of a method of registering a book based on a title of the book according to one embodiment of the present invention.

In general, a title of a different book mentioned in content of a book is distinctively represented by such a book quotation mark as a bracket 902 and the like. Hence, in one embodiment of the present invention, in case of recognizing the title of the different book mentioned in the content of the book, the controller 180 can recognize the title of the different book based on the book quotation mark.

Referring to FIG. 9 (*a*), content of a prescribed book 901 is displayed via the transparent display 430 and the content of the prescribed book 901 includes a title of a different book. In particular, in an example of FIG. 9 (*a*), the title of the different book is "Silent spring". If a sixth gesture is detected on the displayed title of the book, the controller 180 can register a book corresponding to the title of the book. Registration of a book is identical to the registration of a book mentioned earlier with reference to FIG. 8.

Similar to FIG. 8, one embodiment of the present invention proposes that the controller 180 receives a selection of at least one category and registers the book according to the selected category. In case that the controller registers books according to the category, when a user intends to read the registered books, the user can read the books registered according to the category.

If the sixth gesture is detected, the controller 180 can output a pop-up window 803 to receive a selection of a category. In this case, the pop-up window can include selection icons 804-1 to 804-4 used for selecting the category. In an example of FIG. 8 (*c*), the category includes 'book to read', 'book currently reading' and 'book already read'.

If a selection of a category is received from a user via the pop-up window, the controller 180 registers the book according to the selected category and can output a pop-up window 903 informing the user of the registration of the book.

Meanwhile, the wearable device 400 according to one embodiment of the present invention may be connected with a different mobile terminal 100. In this case, "connected" means a status capable of transceiving data between the wearable device 400 and the mobile terminal 100. The wearable device 400 can perform synchronization for at least one status in a manner of exchanging synchronization information with the different mobile terminal 100 currently connected with the wearable device (refer to FIG. 10*a* (a) and (b)). In particular, the wearable device 400 according to one embodiment of the present invention can perform synchronization for a book with the different mobile terminal 100. And, the wearable device 400 according to one embodiment of the present invention can perform synchronization for a configuration (registered favorites) of a prescribed application with the different mobile terminal 100.

The synchronization for the book means an operation of identically maintaining content between a book read by augmented reality of the wearable device 400 and an e-book read by the mobile terminal 100.

FIGS. 10*a* to 10*d* are diagrams for examples of performing synchronization between a wearable device 400 and a mobile terminal 100 according to one embodiment of the present invention.

Referring to FIG. 10 (*c*), a user is reading a prescribed book via the transparent display 430. And, the user can input writing contents 1001*a* to 1003*a* on the prescribed book using a pen 1000 (a real pen or a virtual pen). The controller 180 can control the writing contents 1001*a* to 1003*a*, which are inputted on the prescribed book by the user using the pen 1000, to be displayed on the transparent display 430. Moreover, the controller 180 can control the wireless communication unit 110 to transmit synchronization information on the inputted writing contents 1001*a* to 1003*a* to the at least one mobile terminal 100 currently connected with the wearable device.

Similar to the method of detecting the gesture, the writing contents 1001*a* to 1003*a*, which are inputted via the pen 1000, can be obtained in a manner of analyzing images obtained by the camera 428 in real time or detecting writing inputs detected by the sensing unit 140.

Having received the synchronization information, the mobile terminal 100 can display writing contents 1001*b* to 1003*b* corresponding to the inputted writing contents 1001*a* to 1003*a* in the display 151 of the mobile terminal (refer to FIG. 10 (*d*)).

On the contrary, if the writing contents 1001*b* to 1003*b* are inputted via the mobile terminal 100, it is apparent that the writing contents can be synchronized into the writing contents 100*a* to 1003*a* corresponding to the wearable device 400 in a manner of transmitting synchronization information on the writing contents 1001*b* to 1003*b* to the wearable device 400.

Figure 10B:
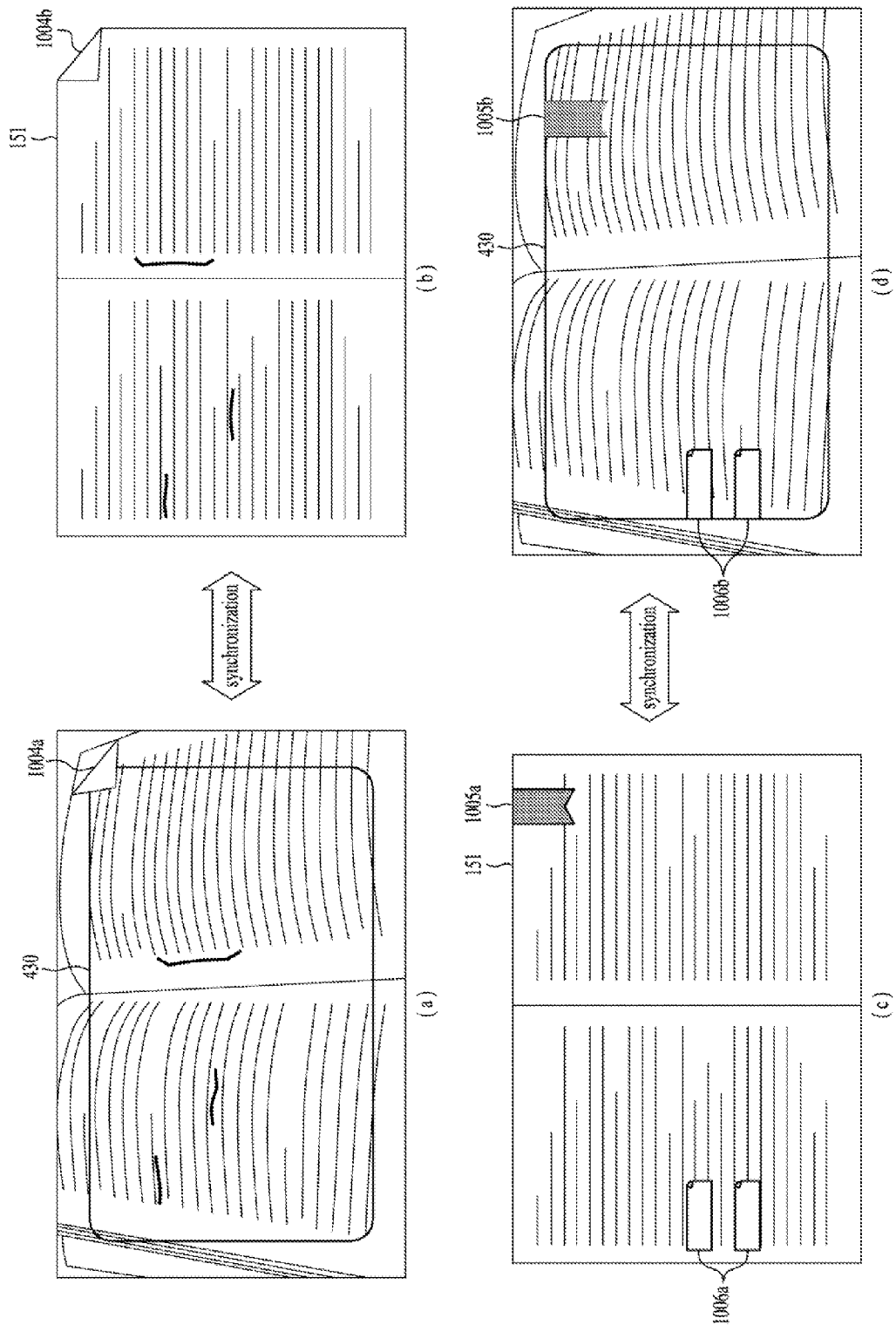

As depicted in examples of FIG. 10*b* (a) and (b), synchronization for information on a position 1004*a* and 1004*b* in which a page is folded can be performed by the wearable device 400 according to one embodiment of the present invention and at least one mobile terminal 100 connected with the wearable device 400.

As depicted in examples of FIG. 10b (c) and (d), synchronization for information on bookmarks 1005a and 1005b and, or memo contents 1106a and 1006b can be performed by the wearable device 400 according to one embodiment of the present invention and at least one mobile terminal 100 connected with the wearable device 400.

Meanwhile, although the aforementioned examples in FIG. 10a and FIG. 10b show an example of synchronizing content included in a book only, by which one embodiment of the present invention may be non-limited. The synchronization for different information can be performed as well. Regarding this, it shall be described with reference to FIG. 10c and FIG. 10d in the following.

Figure 10C:
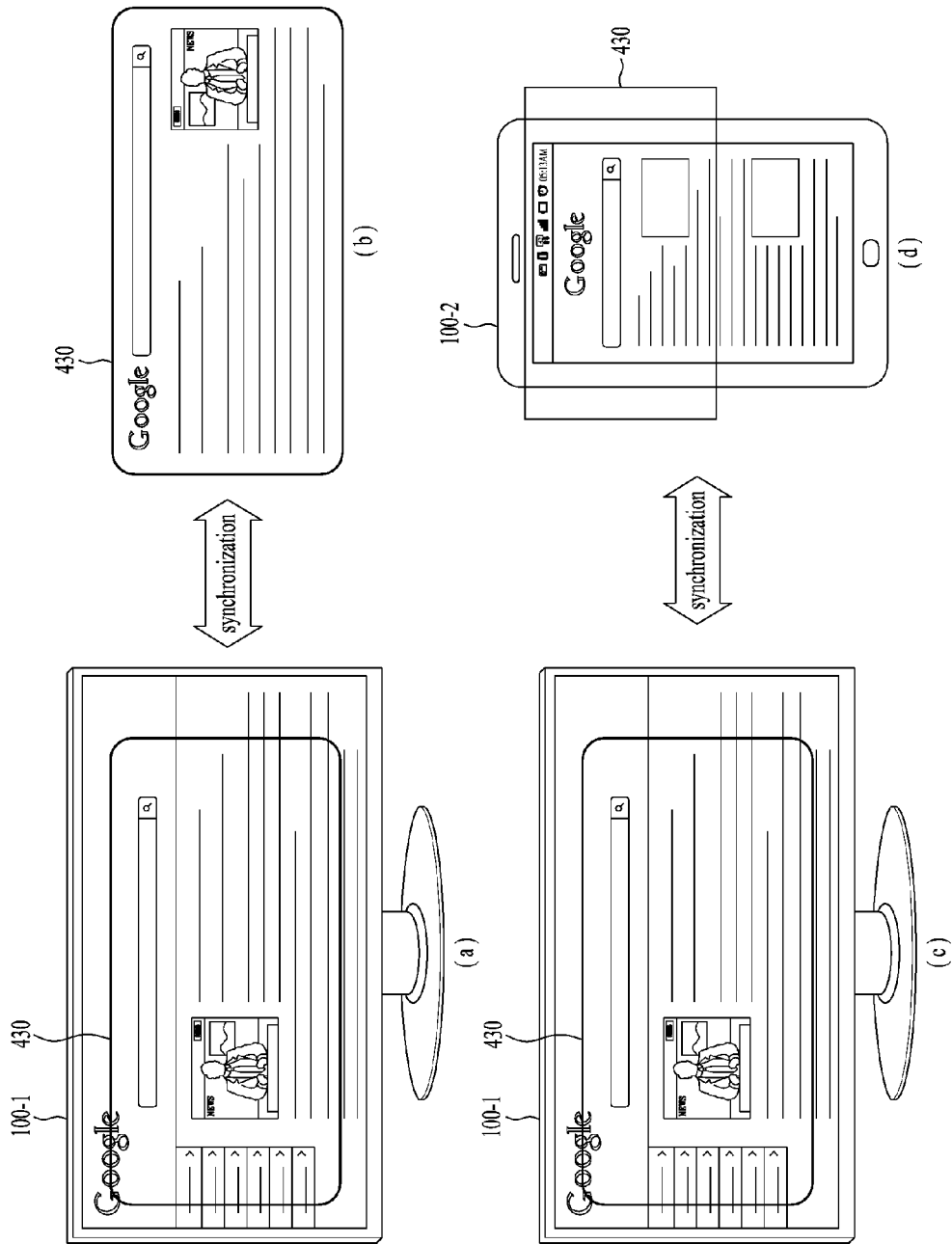

FIG. 10c is a diagram for a method of synchronizing web-page information between terminals connected with each other according to one embodiment of the present invention.

Referring to FIG. 10c (a), a user is reading a prescribed web-page which is displayed in a first terminal 100-1 via the transparent display 430. The wearable device 400 according to one embodiment of the present invention receives synchronization information on the web-page from the first terminal 100-1 and can display an identical web-page in the transparent display 430 itself using the received synchronization information. In particular, the web-page, which is used to be watched via the transparent display 430, can be displayed in the transparent display 430. On the contrary, if synchronization information on the web-page, which is outputted via the transparent display 430 of the wearable device 400, is transmitted to the first terminal 100-1, the web-page can be identically displayed in the first terminal 100-1.

Referring to FIG. 10c (c), a user is reading a prescribed web-page displayed in the first terminal 100-1 via the transparent display 430. The wearable device 400 according to one embodiment of the present invention receives synchronization information on the web-page from the first terminal 100-1, delivers the received synchronization information to a second terminal 100-2 and can display the identical web-page in the second terminal 100-2. In particular, the wearable device can display the web-page, which is used to be displayed in the first terminal 100-1 via the transparent display 430, in a display of the second terminal 100-2 in a manner of moving the web-page. In this case, assume that both the first 100-1 and the second terminal 100-2 are connected with the wearable device 400.

Figure 10D:
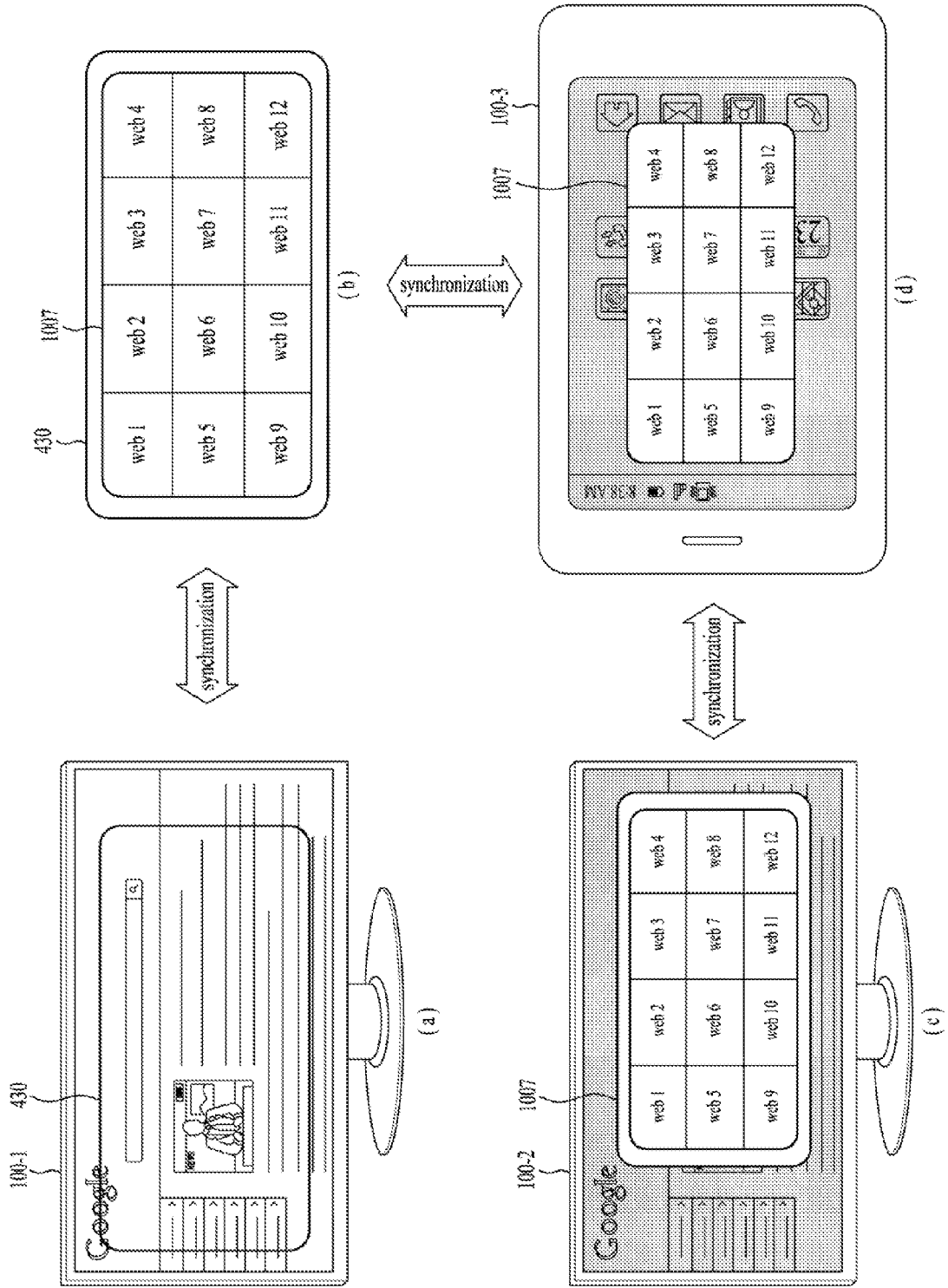

FIG. 10d is a diagram for an operation of synchronization for a favorites list. In this case, assume that a first terminal 100-1, a second terminal 100-2 and a third terminal 100-3 are connected with the wearable device 400.

One embodiment of the present invention proposes to share a favorites list between devices connected to each other. The favorites list may correspond to a list of one or more web-page information selected by a user to store the information. For instance, referring to examples depicted in FIG. 10d, a user of the wearable device 400 is watching a screen of the first terminal 100-1 via the transparent display 430 and a prescribed web-browser is executing in the screen of the first terminal 100-1. The wearable device 400 according to one embodiment of the present invention receives synchronization information on a favorites list of the first terminal 100-1.

Having received the synchronization information on the favorites list from the first terminal 100-1, the wearable device 400 can display the received favorite list 1007 in the transparent display 430 (refer to FIG. 10d (b)). And, the wearable device 400 can deliver the received synchronization information to different terminals. In particular, as depicted in the examples of FIG. 10d, the wearable device can deliver the received synchronization information to the second and the third terminal 100-2/100-3. The second and the third terminal 100-2/100-3 according to one embodiment of the present invention can output the favorites list, respectively using the delivered synchronization information (refer to FIG. 10d (c) and (d)).

Meanwhile, one embodiment of the present invention proposes that the wearable device 400 according to one embodiment of the present invention stores a prescribed word as a keyword based on a pen gesture performed on the prescribed word which is detected by a user. Regarding this, it shall be described with reference to FIG. 11 in the following.

FIG. 11 is a diagram for a method of storing a prescribed word as a keyword based on a pen gesture detected by a user according to one embodiment of the present invention. According to one embodiment of the present invention, an operation of storing a prescribed word as a keyword indicates an operation of storing the prescribed word enabling a user to read the prescribed word again. Regarding this, it shall be described later with reference to FIG. 12 to FIG. 14.

Referring to FIG. 11 (a), a user is reading a prescribed book 901 via the transparent display 430 of the wearable device 400. If a prescribed pen gesture is inputted for a prescribed word, the controller 180 recognizes the prescribed word and can store the recognized word as a keyword. The prescribed pen gesture for the prescribed word may correspond to a gesture of underlining the prescribed word using a pen 1000. Meanwhile, one embodiment of the present invention may be non-limited by the gesture of underlining. In case of a pen gesture capable of specifying a word, it is apparent that the pen gesture can be applied to embodiments of the present invention. For clarity, a case that the prescribed pen gesture corresponds to an underline is explained as an example in the following.

According to one embodiment of the present invention, if the aforementioned pen gesture is inputted, it is able to control the transparent display 430 to display a path 1100 of the gesture with a configured color. A displayed color can be switched by a user selection. Referring to an example of FIG. 11 (a), the controller 180 controls the transparent display 430 to display an underline on the bottom of such a word as "searching" in accordance with the path 1100 of the pen gesture with a predetermined blue color. In particular, the path 1100 is not an underline marked on a real book but a path outputted via the transparent display 430 in an augmented reality.

The controller 180 stores the recognized prescribed word as a keyword in response to the prescribed gesture for the prescribed word and can output a guide phrase 1101 indicating that the prescribed word has been stored as the keyword as depicted in FIG. 11 (b).

Figure 12:
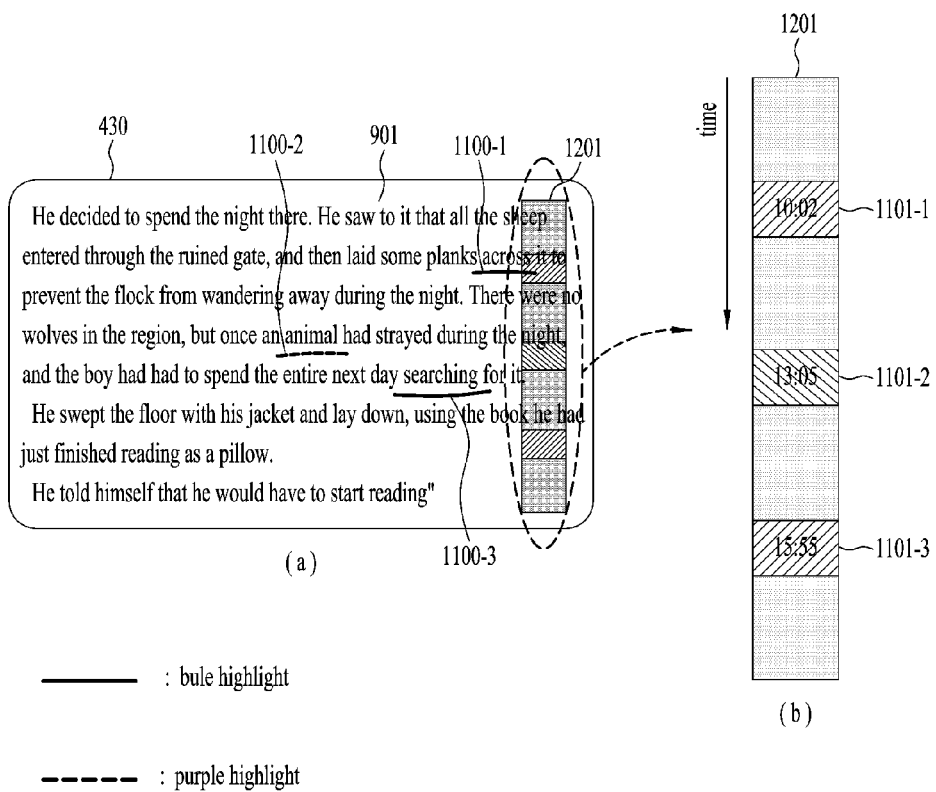
FIGS. 12 to 14 are diagrams for a state of reading a stored keyword according to one embodiment of the present invention.
Figure 13:
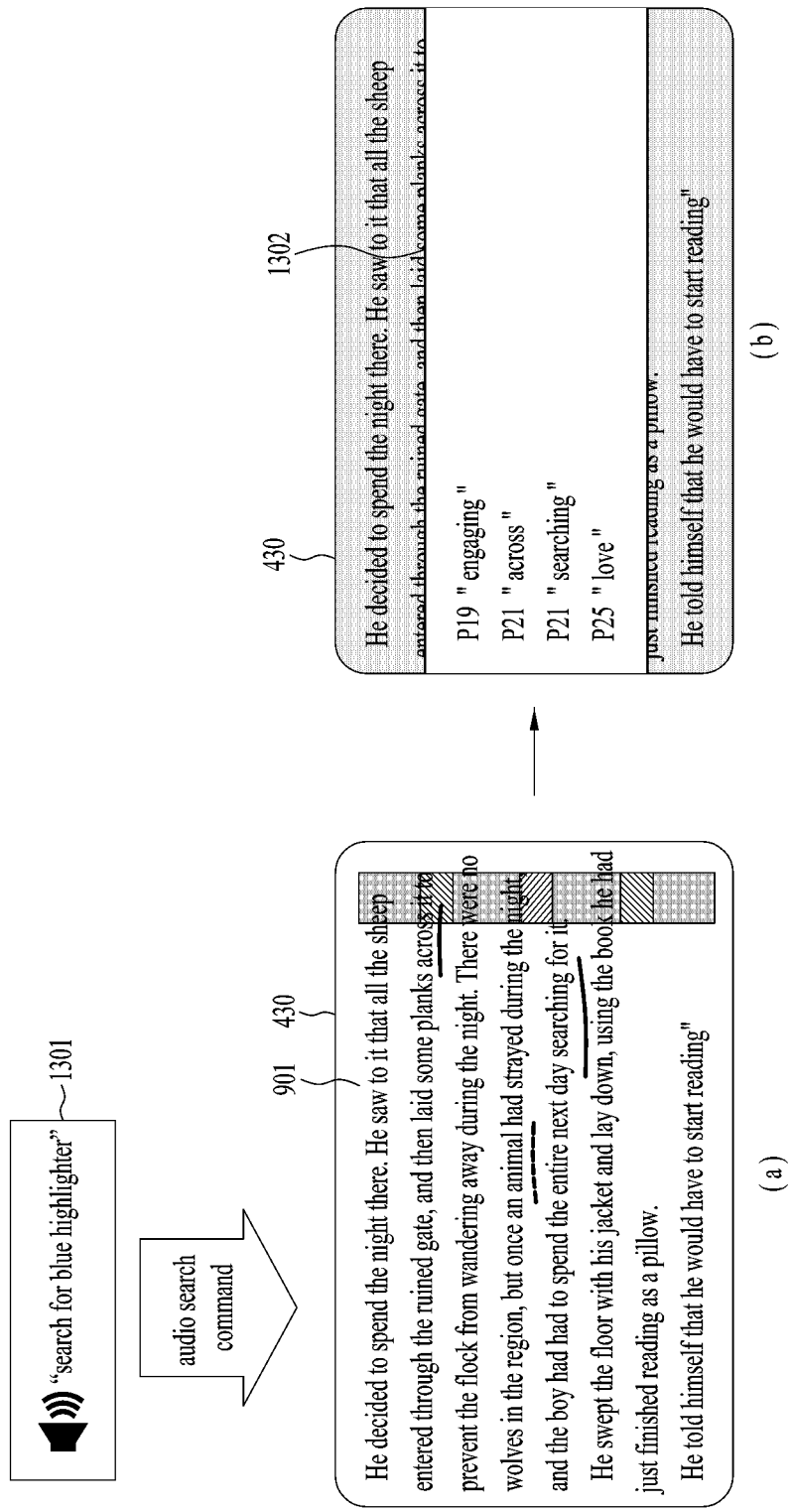
Figure 14:
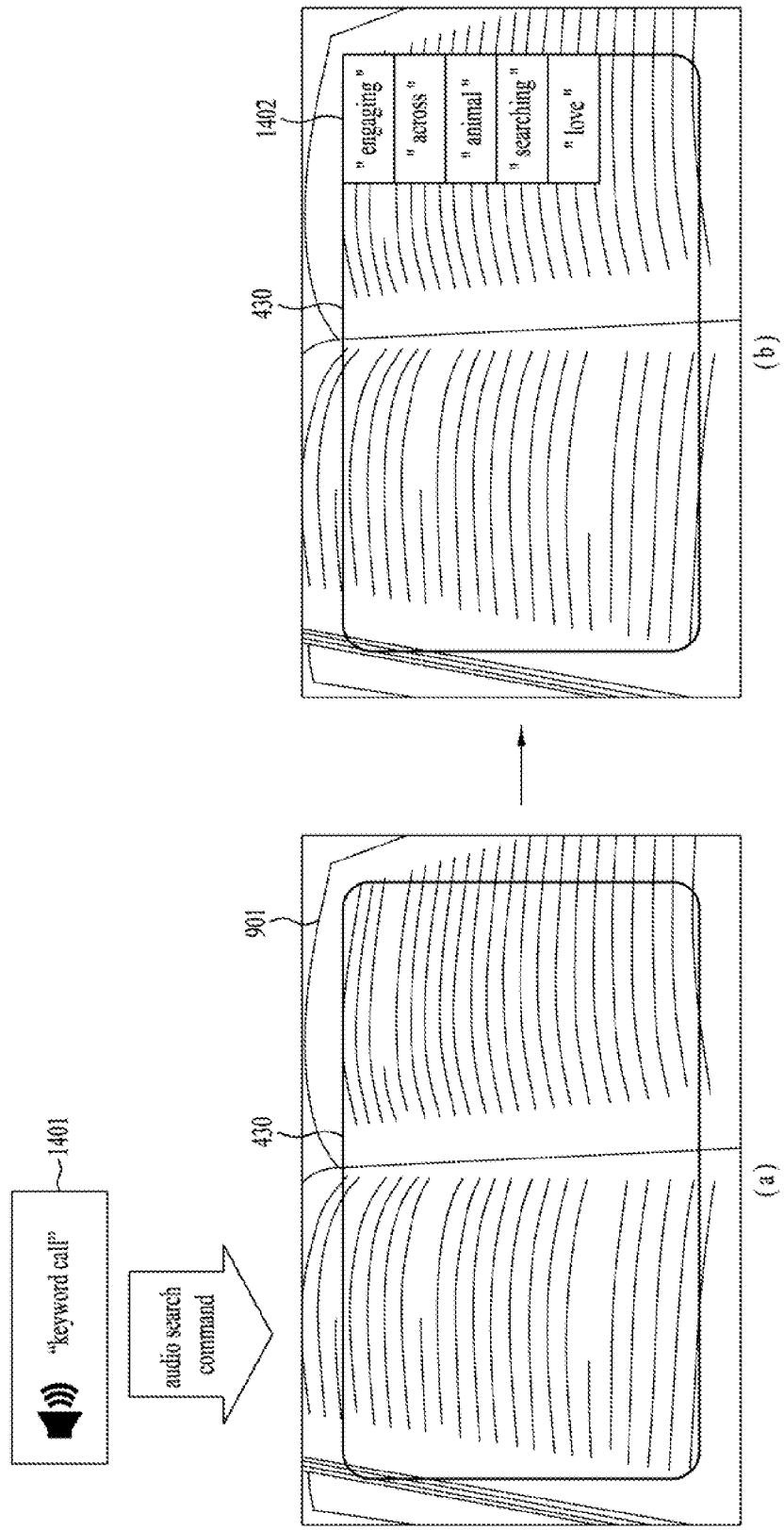

FIGS. 12 to 14 are diagrams for a state of reading a stored keyword according to one embodiment of the present invention.

Referring to FIG. 12 (a), a user is reading a prescribed book via the transparent display 430. The controller 180 according to one embodiment of the present invention controls the transparent display 430 to display a first underline to a third underline 1100-1 to 1100-3 for stored keywords. Assume that the first underline and the third underline 1100-1/1100-3 are displayed with a blue color highlighter and the second underline 1100-2 is displayed with a purple color highlighter.

Moreover, the controller 180 according to one embodiment of the present invention can display a time axis indicator 1201, which displays timing of displaying the first to third underline 1100-1 to 1100-3 together with a time axis, in an augmented reality in which the prescribed book 901 is read via the transparent display 430.

FIG. 12 (*b*) is a diagram showing the aforementioned time axis indicator 1201 in more detail. A bottom direction of the time axis indicator 1201 corresponds to a time axis direction. A timing of displaying each underline is displayed on a position of the time axis indicator 1201 corresponding to the timing together with a time on which each underline is made. In particular, for instance, a display 1101-1 corresponding to the first underline 1100-1 is displayed on a position of the time axis corresponding to the display together with time "10:02" on which the first underline 1100-1 is made.

One embodiment of the present invention provides a user with an environment capable of searching for a keyword by a color of a pen displayed in a keyword reading screen mentioned earlier in FIG. 12. Regarding this, it shall be described with reference to FIG. 13 in the following.

FIG. 13 is a diagram for an example of a method of searching for a keyword according to one embodiment of the present invention. According to embodiment of the present invention described with reference to FIG. 13, the keyword is searched based on a color with which a prescribed word is displayed.

Referring to FIG. 13 (*a*), a user is reading a prescribed book 901 via the transparent display 430 of the wearable device 400. And, in FIG. 13 (*a*), the controller 180 displays a first to a third underline 11001-1 to 1100-3 via an augmented reality of the transparent display 430. In this case, if an audio command for searching for a keyword displayed by a blue color highlighter is received, the controller 180 can control the transparent display 430 to output a list of keywords 1302 displayed by the blue color highlighter from the stored keywords (refer to FIG. 13 (*b*)).

Moreover, as depicted in an example of FIG. 13 (*b*), when the list of keywords 1302 is outputted, the controller 180 can output not only the searched keywords but also page numbers in which the corresponding keywords exist.

Moreover, as mentioned earlier with reference to FIG. 10*a* to FIG. 10*d*, at least one mobile terminal 100 connected with the wearable device 400 can receive synchronization information on the keyword. And, in case of reading an e-book via the mobile terminal 100, the controller of the mobile terminal 100 can display a first to third underline 1100-1 to 1100-3 while outputting a corresponding page. Unlike the wearable device 400 reading a book via the transparent display 430, the e-book can output pages in a manner of moving the pages according to a control of the controller of the mobile terminal 100. Hence, if a keyword is selected from the displayed keyword list 1302, the mobile terminal 100 according to one embodiment of the present invention can output the keyword in a manner of moving to a page in which the keyword exists.

As depicted in FIG. 13 (*b*), when the keyword list 1302 is outputted in the display of the mobile terminal 100, if a command for selecting a prescribed keyword is received, the controller 180 of the mobile terminal 100 can move to a page in which the keyword exists. As an example, the command for selecting the prescribed keyword may correspond to an audio command. In particular, as a specific example of the audio command, when such a keyword list 1302 depicted in FIG. 13 (*b*) is outputted, if "engaging" is received as the audio command, the controller 180 of the mobile terminal 100 can move to a page 19 of an e-book in which the corresponding keyword exists and can display the keyword.

FIG. 14 is a diagram for a different example of a method of searching for a keyword according to one embodiment of the present invention.

Referring to FIG. 14 (*a*), a user is reading a prescribed book 901 via the transparent display 430 of the wearable device 400. As depicted in FIG. 14 (*b*), if a command for calling a keyword is received, the controller 180 can control the transparent display 430 to display a stored keyword list 1402. Unlike FIG. 13, a list 1402 for all stored keywords is displayed irrespective of a displayed color in FIG. 14 (*b*).

Figure 15:
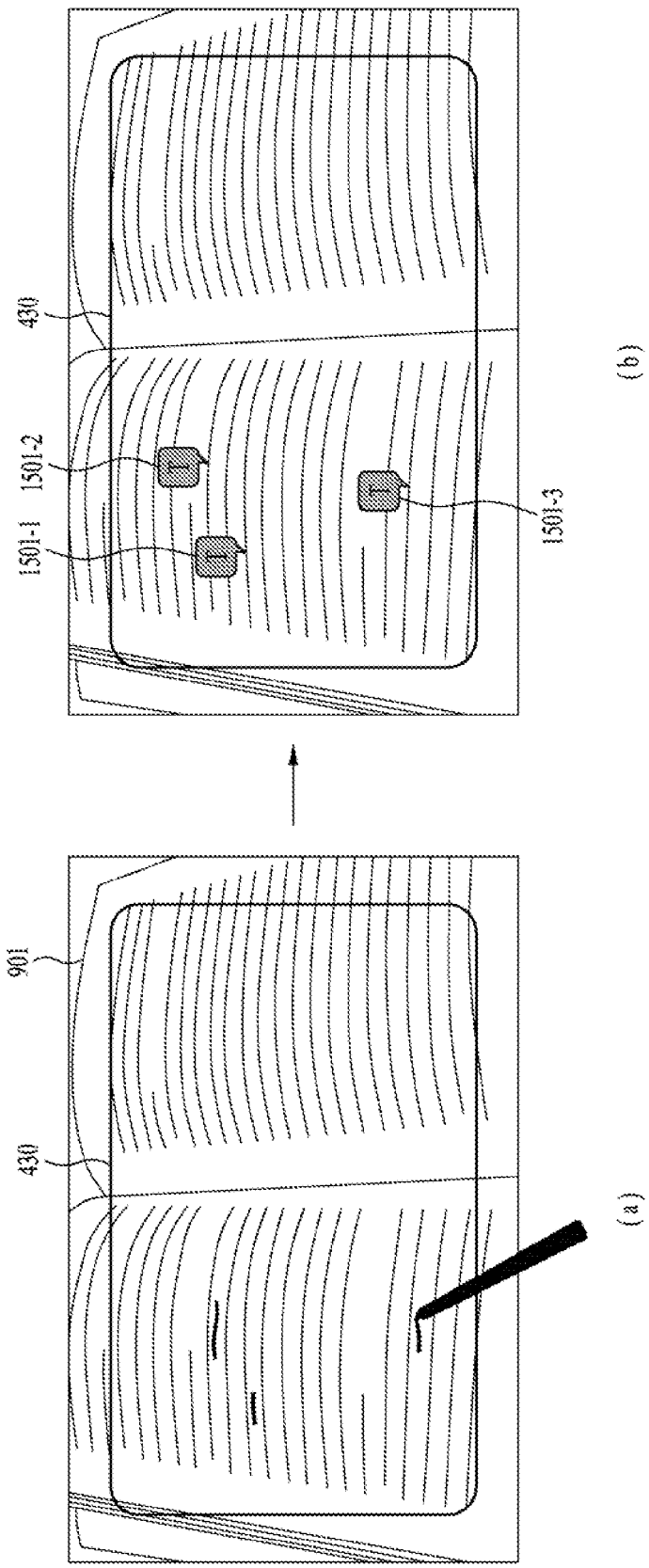
FIG. 15 is a diagram for a method of displaying a tag indicator in response to a writing input of a user according to one embodiment of the present invention.

FIG. 15 is a diagram for a method of displaying a tag indicator in response to a writing input of a user according to one embodiment of the present invention.

Referring to FIG. 15 (*a*), a user is reading a prescribed book 910 via the transparent display 430 of the wearable device 400. When a user inputs a writing content on the prescribed book 910, one embodiment of the present invention proposes to display a tag indicator 1501 in a position of the writing content.

Referring to FIG. 15 (*a*), the controller 180 displays underlines inputted by the user via the transparent display 430. FIG. 15 (*b*) shows tag indicators 1501-1 to 1501-3 corresponding to the displayed underlines. As depicted in FIG. 15 (*b*), if an underline input of the user is detected, the controller 180 can output the tag indicators 1501-1 to 1501-3 in positions in which the underline inputs are detected.

Meanwhile, one embodiment of the present invention proposes a controlling method of easily searching for a prescribed word or a sentence. The controlling method is explained with reference to FIG. 16 and FIG. 17 in the following.

Figure 16:
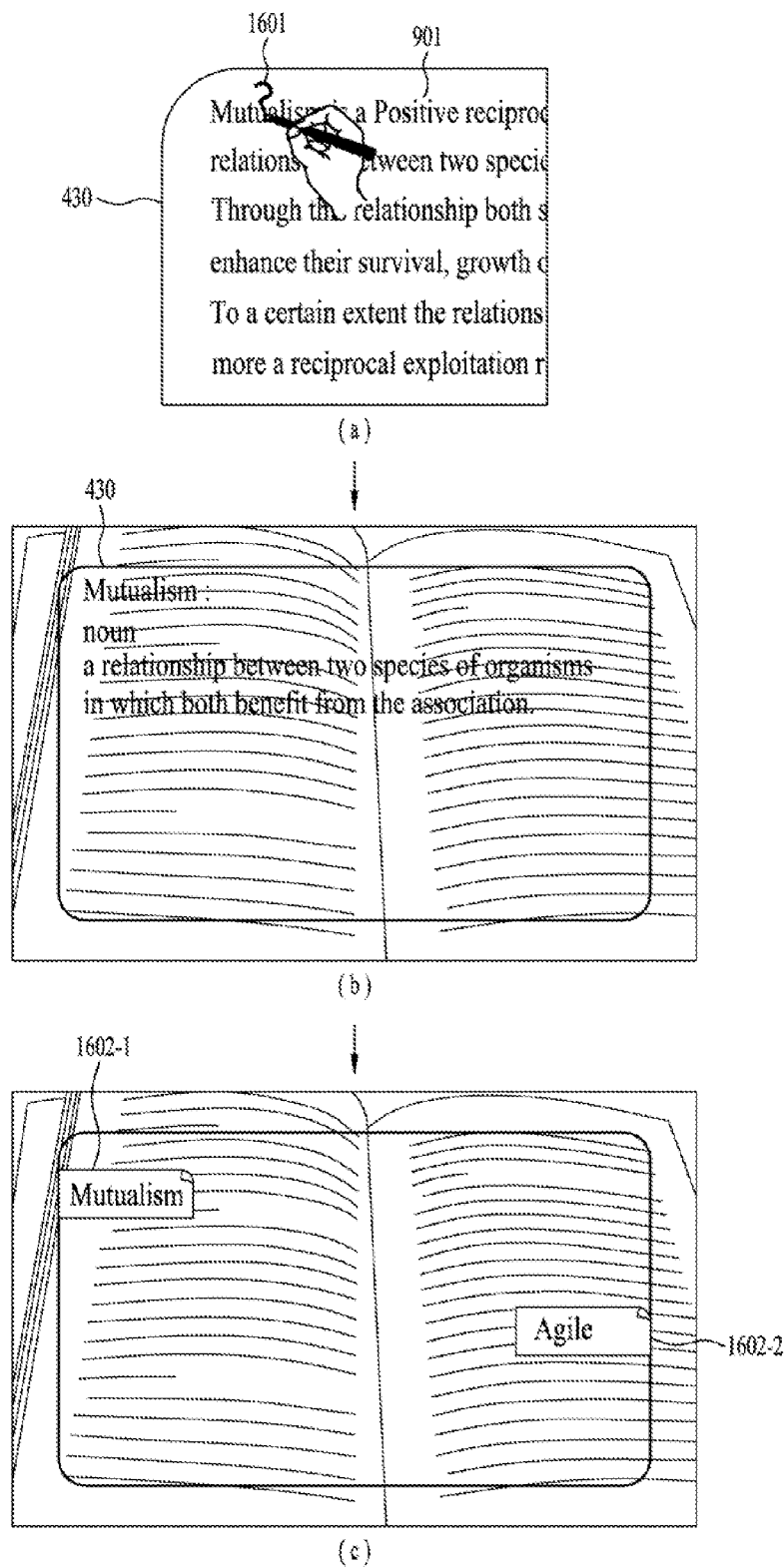
FIG. 16 and FIG. 17 are diagrams for a method of providing a search result for a prescribed word in response to a prescribed gesture for the prescribed word according to one embodiment of the present invention.
Figure 17:
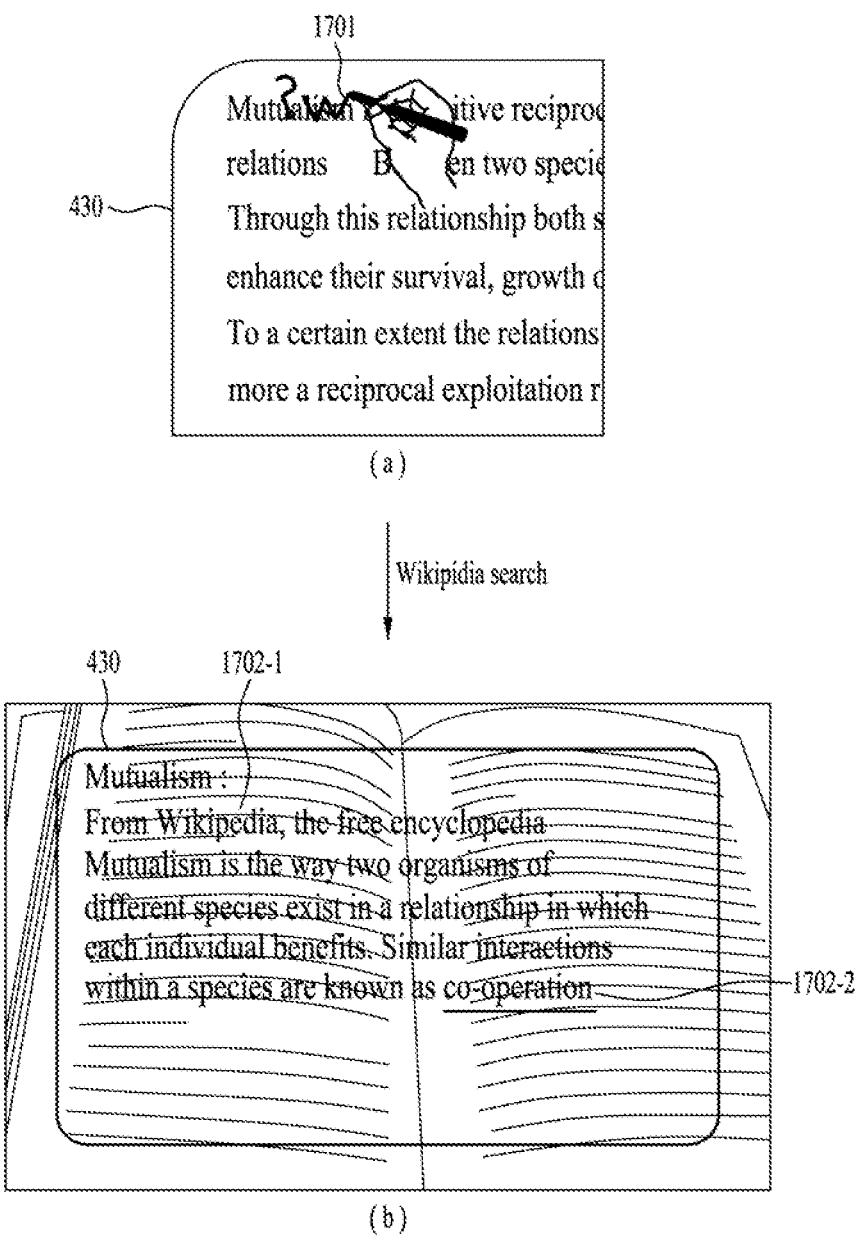

FIG. 16 and FIG. 17 are diagrams for a method of providing a search result for a prescribed word in response to a prescribed gesture for the prescribed word according to one embodiment of the present invention.

Referring to FIG. 16 (*a*), assume that a user is reading a prescribed book 901 via the transparent display 430 of the wearable device 400. When the user is reading the prescribed book 901, there may exist a word (hereinafter a search target word) that the user intends to search for. Hence, if a prescribed gesture is inputted on the search target word, one embodiment of the present invention proposes to provide a search result for the search target word in response to the prescribed gesture.

As an example, the prescribed gesture may correspond to a gesture (a seventh gesture) 1601 of drawing a question mark on the search target word using a pen 1000. If the aforementioned seventh gesture is detected, the controller 180 searches for the search target word and can output a searched result (refer to FIG. 16 (*b*)). Meanwhile, in case of searching for the search target word, if there exists a search database, which is separately stored in the wearable device 400, the stored search database can be used. And, if there is no separate search database, the controller 180 accesses a web using the wireless communication unit 110 to search for the search target word and can output a searched result as depicted in FIG. 16 (*b*).

According to one embodiment of the present invention, after a search for the search target word is performed, search result indicators 1602-1 and 1602-2 capable of reading the search result again can be outputted via the transparent display 430 (refer to FIG. 16 (*c*)). Referring to an example depicted in FIG. 16 (*c*), the controller 180 outputs not only a search result indicator 1602-1 corresponding to a word "Mutualism" searched in FIG. 16 (*a*) but also a different search result indicator 1602-2. As depicted in FIG. 16 (*b*), if an input for selecting the search result indicators 1602-1 and 1602-2 is received, the controller 180 can output a search result again.

Moreover, one embodiment of the present invention proposes to enable a user to more specifically designate a searching method. In particular, if a gesture for designating a prescribed searching method is additionally inputted together with the seventh gesture 1601, the controller 180 searches for a prescribed word according to the designated searching method. Regarding this, it shall be described with reference to FIG. 17 in the following.

Similar to FIG. 16, referring to FIG. 17 (a), a user is reading a prescribed book 901 via the transparent display 430. If the user inputs a gesture (hereinafter an eighth gesture) 1701 of drawing a prescribed patter using a pen 1000 for a prescribed word together with the seventh gesture 1601 and the controller 180 detect the seventh and the eighth gesture, the prescribed word can be searched using a designated method.

In FIG. 17 (b), assume that the designated method is to access such a web-page as Wikipedia and search. As depicted in FIG. 17 (b), if the seventh and the eight gesture are detected, the controller 180 searches for such a word as "Mutualism" in the Wikipedia web-page and can display a searched result.

Meanwhile, according to one embodiment of the present invention, writing content of a user can be stored as a memo. Regarding this, it shall be described with reference to FIG. 18 and FIG. 19 in the following.

FIG. 18 is a diagram for a method of storing a writing content as a memo according to one embodiment of the present invention.

In FIG. 18 (a), assume that a user is reading a second book 902 via the transparent display of the wearable device 400. If an input of writing content 1801 is received from the user, the controller 180 detects the writing content 1801 and can store the detected writing content 1801 as a memo.

Referring to FIG. 18 (a), the user inputs such writing content 1801 as "NEXT MONDAY QUIZ" on the second book 902 using the pen 1000. According to one embodiment of the present invention, the writing content 1801 may correspond to a writing written on the second book 902 by ink according to a written path using an actual pen 1000 and the like. According to a different embodiment of the present invention, the writing content 1801 may correspond to a writing path detected by an end part of a virtual pen 1000. Hence, although no writing is displayed on the second book 902, the writing content may be obtained by detecting the gesture of writing the writing content 1801.

After the input of the writing content 1801 is completed, if an additional input is not inputted for more than a prescribed time, as depicted in FIG. 18 (b), the controller 180 can output a pop-up window 1802 asking a method of storing the writing content 1801. The pop-up window 1802 can include selection icons indicating whether the writing content is stored as "image" 1802a or "text" 1802b.

If a selection icon 1802a for storing the writing content as an image is selected, the controller 180 controls the camera 429 to capture an image of the writing content 1801 and stores the captured image to store the writing content 1801 as a memo.

If a selection icon 1802b for storing the writing content as a text is selected, the controller 180 can store a result of recognizing the writing content 1801 as a text as a memo.

FIG. 19 is a diagram showing a state of reading a memo stored in FIG. 18.

Referring to FIG. 19 (a), a memo indicator 1901 for writing content written on a second book 902 is outputted while a user is reading a first book 901 via the transparent display 430 of the wearable device 400. In particular, although the writing content 1901, which is mentioned earlier in FIG. 18, is written on the second book 901, one embodiment of the present invention proposes to enable the user to read the writing content in the first book 901 as well. The memo indicator 1901 is an indicator indicating that there exists a stored memo. The memo indicator can include a preview for a part of a memo. If an input (e.g., input touching the memo indicator 1901) for selecting the memo indicator 1901 is received, the controller 180 can control the transparent display 430 to display a pop-up window 1902 capable of displaying the whole of the stored memo.

Meanwhile, one embodiment of the present invention proposes a method of automatically searching for a prescribed password and displaying the password via the transparent display 430 of the wearable device 400 of a glasses form. In general, a password is information in which security is required. Hence, if a password is displayed via the display, it may become vulnerable to security. Yet, in case of using the wearable device 400 of a glasses form, since the information displayed via the display is seen by a user wearing the wearable device only, a chance to be vulnerable to security may be reduced. Regarding this embodiment, it shall be described in detail with reference to FIG. 20 and FIG. 21 in the following.

FIG. 20 and FIG. 21 are diagrams for a controlling method of automatically searching for a password and displaying the password for a user according to one embodiment of the present invention.

Referring to FIG. 20 (a), a user is displaying a login screen for a prescribed page displayed in a different mobile terminal 100 via the transparent display 430 of the wearable device 400.

If the login screen and a login ID are detected, the controller 180 searches for a login password corresponding to the login ID and can provide the searched login password to the user. In this case, the login ID and the login password can be stored in the wearable device 400 in advance by the user. The login screen can include an ID input window 2001a and a password input window 2001b.

According to one embodiment of the present invention, as depicted in FIG. 20 (b), if the login screen and the login ID are detected, the controller 180 can output a pop-up window 2002 for checking whether to display a login password. The pop-up window 2002 can include a "display" icon 2002a and a "cancel" icon 2002b.

If an input for selecting the cancel icon 2002b is received, the controller 180 may operate not display the login password.

As depicted in FIG. 20 (c), if an input for selecting the display icon 2002a is received, the controller 180 can control the transparent display 430 to display a login password 2003 ("secret1234" in an example of FIG. 20) corresponding to a detected login ID.

Besides the login operations mentioned earlier in FIG. 20, if an input of such a password as an electronic certificate (e.g., an accredited certificate used for logging in a bank and the like) is necessary, one embodiment of the present proposes to display and provide the input as well. The electronic certificate indicates encrypted identification information stored in a personal computer or a removable memory to perform a login requiring tighter security level in a bank and the like. In case of using the electronic certificate, a password of the electronic certificate is required to be inputted by a user. Regarding this, it shall be described in detail with reference to FIG. 21 in the following.

Referring to FIG. 21 (a), a user is reading a web page of a bank and an electronic certificate password input window 2102 via the transparent display 430 while wearing the wearable device 400. In FIG. 21 (a), the electronic certificate password input window 2102 shows a name of an accredited certificate as "James".

If the accredited certificate password input window 2102 and the name of the certificate are detected, the controller 180 can output a pop-up window 2103 asking whether to display an accredited certificate password corresponding to the detected certificate name. The pop-up window 2103 can include a "display" icon 2103a and a "cancel" icon 2103b.

If an input for selecting the cancel icon 2103b is received, the controller 180 may not display the accredited certificate password.

As depicted in FIG. 21 (c), if an input for selecting the display icon 2103a is received, the controller 180 can control the transparent display 430 to display a certificate password 2104 ("secret1234" in an example of FIG. 21) corresponding to a detected certificate name.

In the following, a controlling method of easily sharing a favorites list is described with reference to FIG. 22.

Figure 22:
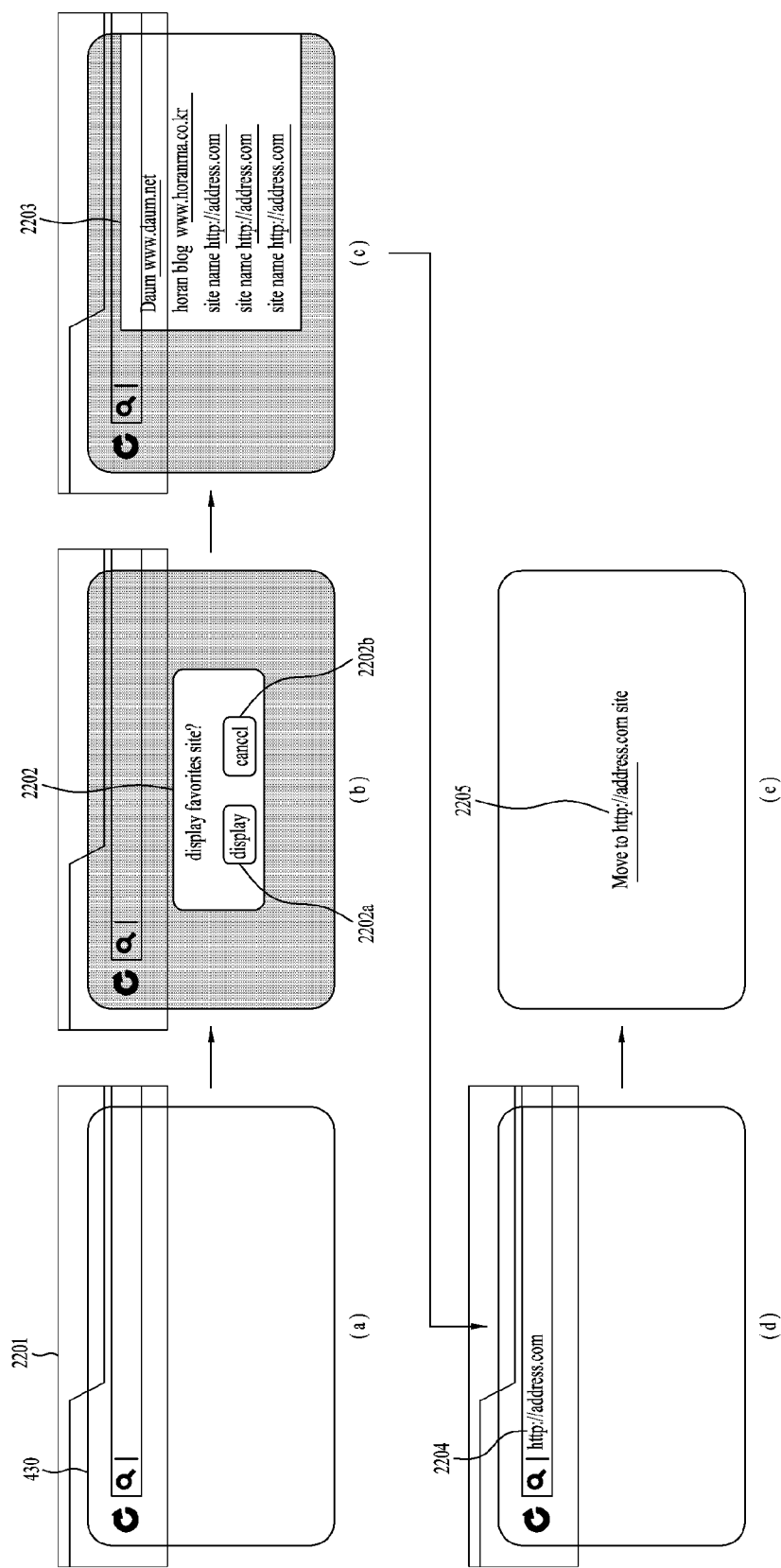
FIG. 22 is a diagram of a controlling method for a wearable device 400 to share a favorites list with a different terminal according to one embodiment of the present invention.

FIG. 22 is a diagram of a controlling method for a wearable device 400 to share a favorites list with a different terminal according to one embodiment of the present invention. In embodiment of the present invention related to FIG. 22, assume that the wearable device 400 has stored a favorites list in advance.

Referring to FIG. 22 (a), a user is reading a web browser screen 2201 outputted from a different terminal via the transparent display 430 while wearing the wearable device 400.

If an address input window is detected on the web browser screen 2201, the controller 180 can control the pre-stored favorites list to be displayed via the transparent display 430.

Specifically, referring to FIG. 22 (a), the controller 180 detects the address input window on the web browser screen 2201. Referring to FIG. 22 (b), the controller outputs a pop-up window 2202 asking whether to display a favorites list. The pop-up window 2202 can include a "display" icon 2202a and a "cancel" icon 2202b.

If an input for selecting the cancel icon 2202b is received, the controller 180 may not display the favorites list.

As depicted in FIG. 22 (c), if an input for selecting the display icon 2202a is received, the controller 180 can control the transparent display 430 to display the favorites list 2203.

In one embodiment of the present invention, assume that the terminal displaying the web browser and the wearable device 400 are connected with each other. In particular, assume that the wearable device 400 is able to transmit data to the terminal displaying the web browser. If an input for selecting one from the displayed favorites list 2203 is received, the controller 180 can transmit information on the selected favorites list to the terminal displaying the web browser. Having received the information, the terminal displaying the web browser can automatically fill in the address input window with a received a web page address.

According to a different embodiment of the present invention, assume that the wearable device 400 and a terminal displaying a web browser are not connected with each other. Or, assume that web page information cannot be transceived between the wearable device and the terminal displaying the web browser although wearable device and the terminal are connected with each other. In this case, a user reads an address of a currently displayed favorites list and can directly input the address by typing it using an input means of the terminal displaying the web browser.

If the address is inputted (automatically or manually (typing input)), the terminal displaying the web browser can control a corresponding web page to be displayed (refer to FIG. 22 (e)).

Figure 23:
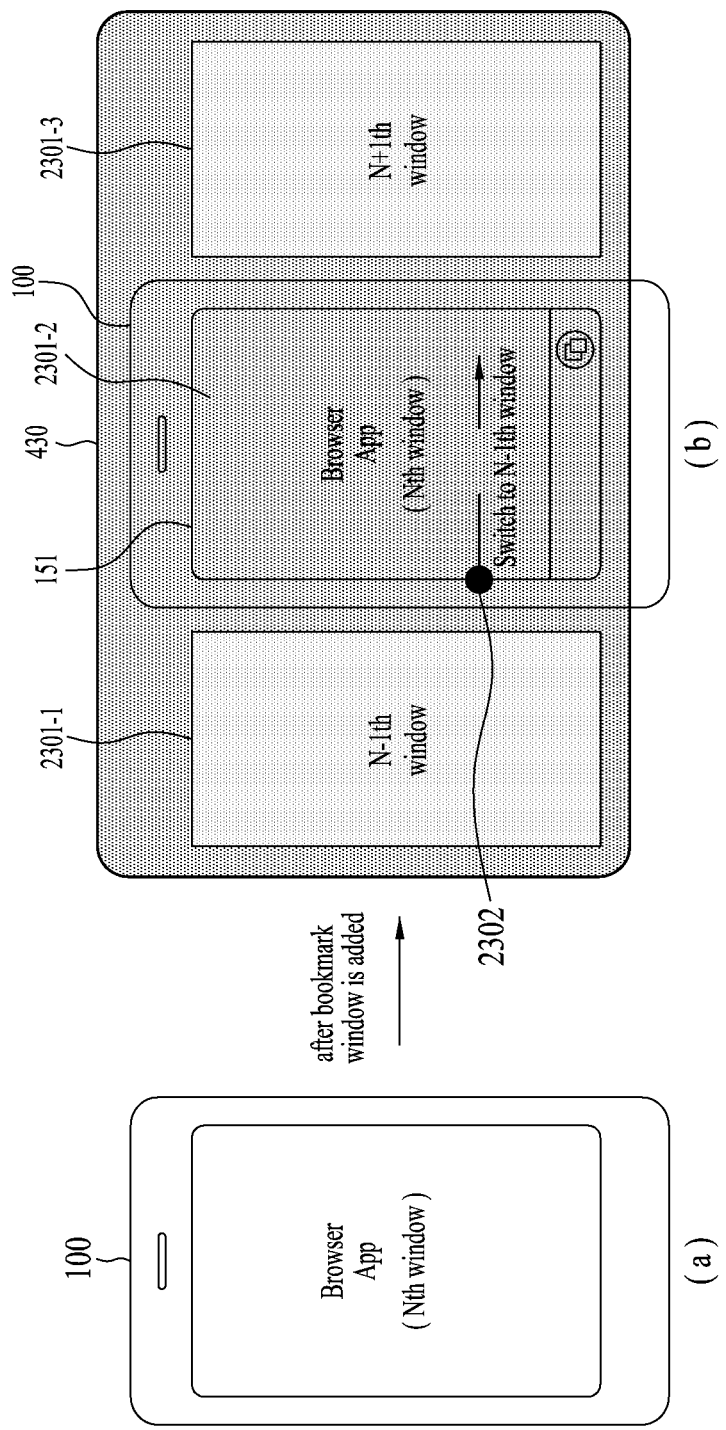
FIG. 23 and FIG. 24 are diagrams for a method of assisting in expanding a screen of a different mobile terminal 100 via a transparent display 430 of a wearable device 400 according to one embodiment of the present invention.
Figure 24:
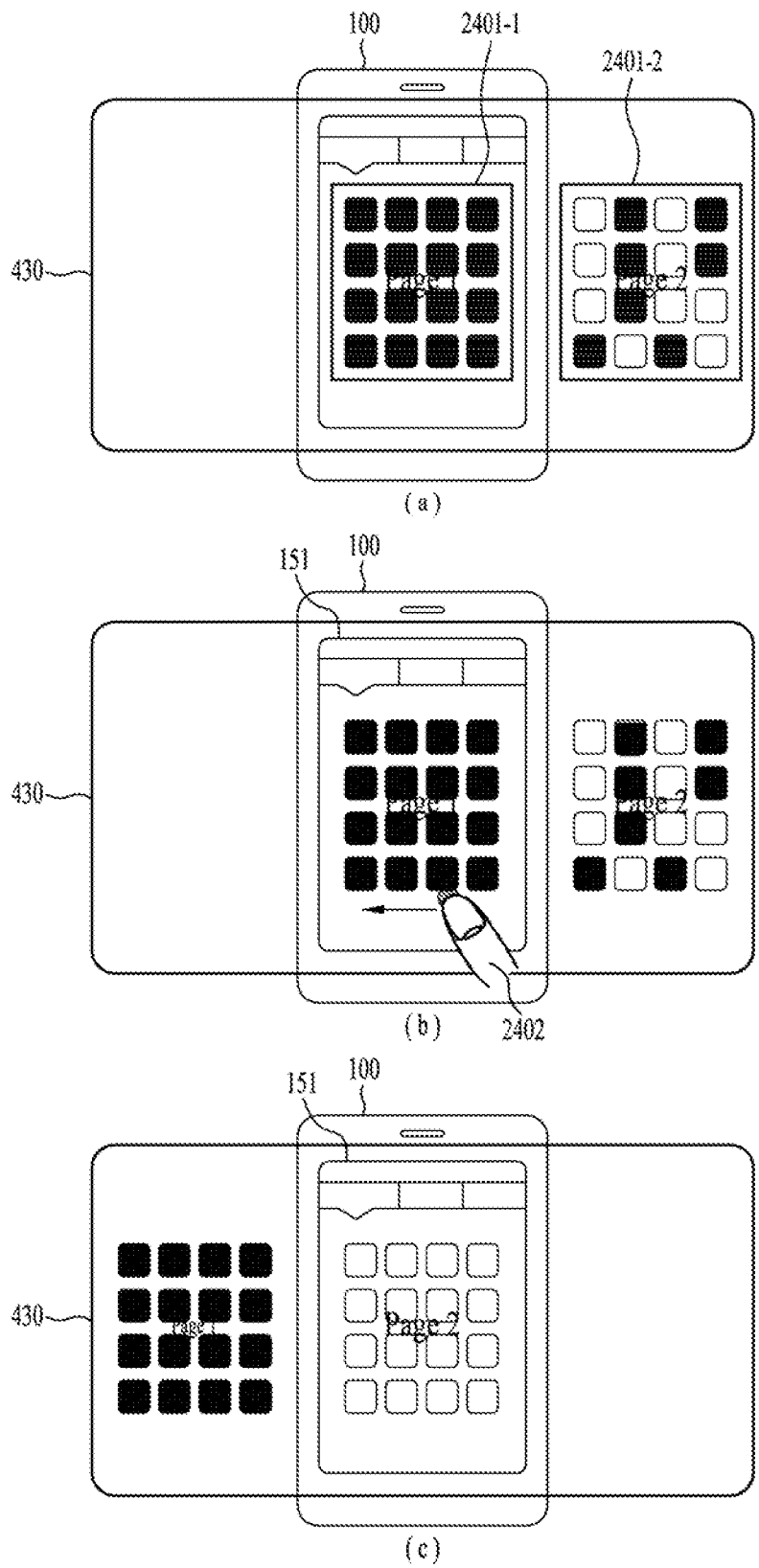

FIG. 23 and FIG. 24 are diagrams for a method of assisting in expanding a screen of a different mobile terminal 100 via a transparent display 430 of a wearable device 400 according to one embodiment of the present invention.

FIG. 23 (a) shows a state for a screen of a web browser application of the mobile terminal 100. Assume that the web browser application supports a bookmark function in the screen. And, in an example explained with reference to FIG. 23, assume that pages as many as N+1 are stored in the mobile terminal 100 as bookmarks and a plurality of bookmark pages can be switched by a left/right scroll.

According to one embodiment of the present invention, if it detected that the mobile terminal 100 is displaying a $N^{th}$ bookmark page 2301-2, the controller 180 of the wearable device 400 controls the transparent display 430 to display a $N-1^{th}$ bookmark page 2301-1 and a $N+1^{th}$ bookmark page 2301-3 in the left and the right of the mobile terminal 100, respectively. And, if a bookmark page is switched by the left/right scroll 2302, the controller 180 can control the transparent display 430 to display a previous page of the switched bookmark page and a following page of the switched bookmark page in the left and the right of the mobile terminal 100, respectively.

Referring to FIG. 24 (a), the mobile terminal 100 displays at least one application icon 2401-1 together with a home screen.

The home screen is explained in more detail. The home screen may correspond to a screen firstly displayed on a touch screen when a locked state of the touch screen is cancelled. One or more icons or widgets used for executing an application or an internal function can be displayed in the home screen. Two or more home screens can exist in the mobile terminal. In this case, if a prescribed touch gesture is performed on the touch screen, the two or more home screens can be sequentially displayed one by one. Icons (widgets) different from each other can be arranged on the home screens, respectively.

In embodiment explained with reference to FIG. 24, assume that there exists a home screen of two pages. And, assume that a first icon group 2401-1 and a second icon group 2401-2 exist in each of the two pages, respectively. If the wearable device 400 detects that the mobile terminal 100 displays a first page of the home screen via a display 151 of the mobile terminal, the wearable device 400 can control the transparent display 430 to display a second page of the home screen and the second icon group 2401-2 in a right area of the mobile terminal 100. In particular, since the first page of the home screen is displayed via the display of the mobile terminal 100 only, it is proposed that the second page of the home screen is displayed via the transparent display 430 of the wearable device 400. In order to display the second page of the mobile terminal 100, the wearable device 400 can directly receive information (i.e., information on the second icon group 2401-2) on the second page from the mobile terminal 100. Or, the wearable device can take a picture of a screen of the second page and can display the captured image via the transparent display.

If it is detected that the home screen displayed in the mobile terminal 100 is switched to a different page, the controller 180 can control each of a previous page and a following page of a switched page to be displayed in the left and the right of the mobile terminal, respectively.

As depicted in FIG. 24 (b), if it is detected that the home screen displayed via the mobile terminal 100 is switched to the second page 2402, the controller 180 can control the transparent display 430 to display the first page of the home screen and the first icon group 2401-1 in the left area of the mobile terminal 100. If the home screen include a third page, the controller 180 can control the transparent display 430 to display the third page in the right area of the mobile terminal 100.

Meanwhile, the wearable device 400 of a glasses form according to one embodiment of the present invention has a limitative input means. This is because it is difficult for the wearable device to be equipped with a touch screen, which corresponds to an input means applicable to a general mobile terminal. Hence, one embodiment of the present invention proposes a controlling method of using a mobile terminal 100 connected with the wearable device 400.

Figure 25:
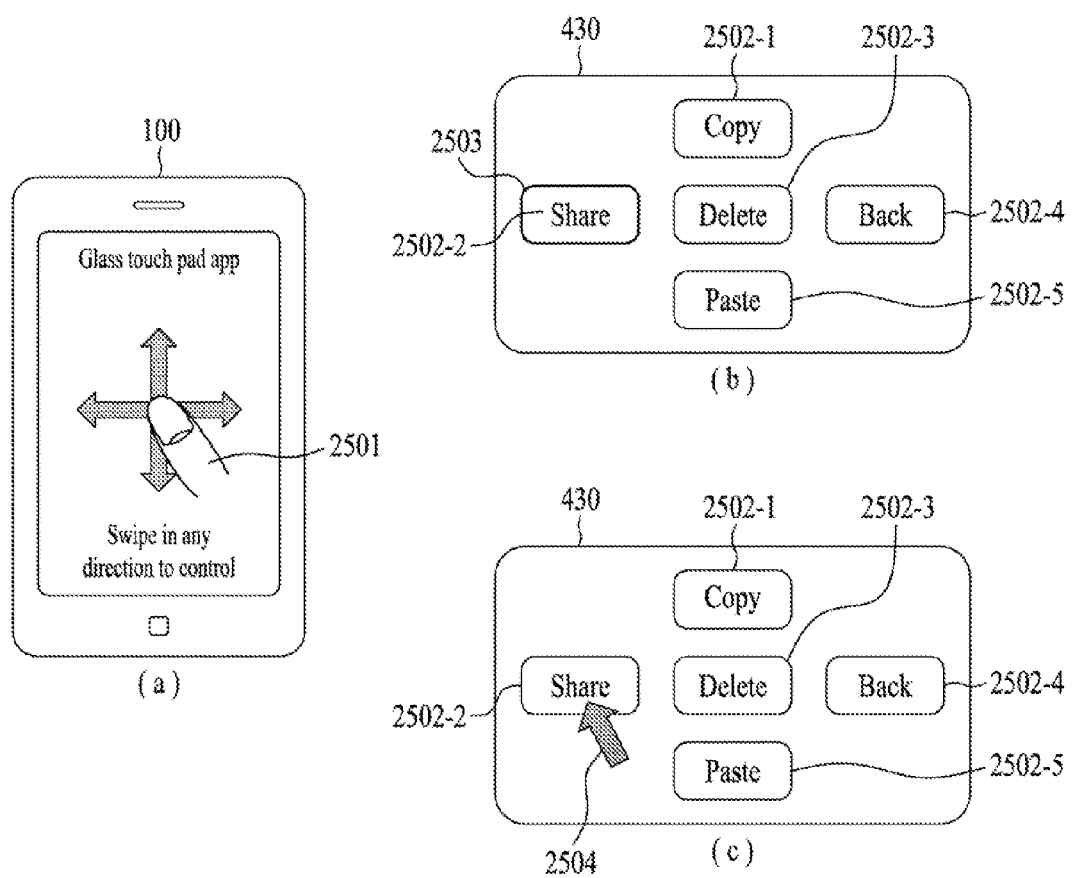
FIG. 25 is a diagram for a method of controlling a wearable device 400 using a different mobile terminal 100 according to one embodiment of the present invention.

FIG. 25 is a diagram for a method of controlling a wearable device 400 using a different mobile terminal 100 according to one embodiment of the present invention.

FIG. 25 (*a*) shows the mobile terminal 100 connected with the wearable device 400. The mobile terminal 100 can transmit a control signal for controlling the wearable device 400 to the wearable device 400. The mobile terminal 100 may use an application configured to generate and transmit the control signal.

FIG. 25 (*b*) and FIG. 25 (*c*) show a state of the transparent display 430 of the wearable device 400 controlled by the mobile terminal 100. As depicted in the drawings, there exist a plurality of control icons 2502-1 to 2501-5 used for controlling the wearable device 400. In order to explain one embodiment of the present invention, a method of selecting a "Share" icon 2502-2 from a plurality of the control icons 2502-1 to 2501-5 is explained in the following.

Referring to FIG. 25 (*b*), a determination indicator 2503 is outputted on one icon among a plurality of the control icon 2502-1 to 2501-5. If a determination command is received, the icon at which the determination indicator 2503 is positioned is executed. In particular, in order to select the "share" icon 2502-2, a user puts the determination indicator 2503 on the "Share" icon 2502-2 and can input the determination command.

In this case, the mobile terminal 100 can receive an up down left right drag input 2501 from a user via a touch screen 151 to change a position of the determination indicator 2503. And, the determination command may correspond to a touch input touching the touch screen 151 once.

Referring to FIG. 25 (*c*), a cursor 2504 can be outputted together with a plurality of the control icons 2502-1 to 2502-5. If a determination command is received, an icon at which the determination cursor 2504 is positioned is executed. In particular, in order to select the "share" icon 2502-2, a user puts the cursor 2504 on the "Share" icon 2502-2 and can input the determination command.

In this case, the mobile terminal 100 can receive an up down left right drag input 2501 from a user via a touch screen 151 to change a position of the cursor 2504. And, the determination command may correspond to a touch input touching the touch screen 151 once.

FIG. 26 is a flowchart for a method of capturing a screen in response to detection of a prescribed gesture according to one embodiment of the present invention.

In the step S2601, the controller 180 of the wearable device 400 can detect that a user is wearing the wearable device 400 using the sensing unit 140.

In the step S2602, the controller 180 can detect a capture gesture formed by a hand of a user on a prescribed page of a book seen via a glass.

In the step of S2602-1, the capture gesture may correspond to a gesture touching a first point of the prescribed page and dragging to a second point by a finger. Moreover, as mentioned earlier with reference to FIG. 5, a first gesture may correspond to an input pointing to the first point for more than a prescribed time and then dragging to the second point while an index finger is unfolded and remaining fingers are folded. In addition, the first gesture may correspond to a gesture of dragging from the first point to the second point more than a prescribed distance. In particular, if the distance of dragging is less than the prescribed distance, the controller 180 may not recognize it as the first gesture.

In the step S2602-2, the capture gesture may correspond to a gesture (second gesture) that a first finger touches the first point on the prescribed page and a second finger touches a second point on the prescribed page. As mentioned earlier with reference to FIG. 6, the second gesture may correspond to a gesture touching the first point (a point at which an index finger of a hand 601 is pointing) and the second point (a point at which an index finger of a hand 501 is pointing) while index fingers of both hands are unfolded and remaining fingers except the index fingers are folded. Moreover, the second gesture may correspond to a gesture maintaining the touch for more than a prescribed time.

In the step S2602-3, the capture gesture may correspond to a gesture (third gesture) of covering the whole of the prescribed page with a palm for more than a prescribed time. As mentioned earlier with reference to FIG. 7, time of covering the prescribed page using the palm may be more than the prescribed time. In particular, if the touch gesture is inputted less than the prescribed time, the controller 180 does not recognize the touch gesture as the third gesture and may not perform a capturing operation.

In the step S2603, the controller 180 can receive a selection of a storing scheme from a user. If the user selects 'store as image', it may proceed to the step S2604. If the user selects 'store as text', it may proceed to the step S2605.

In the step S2604, the controller 180 performs a capture operation for a part of the prescribed page and stores a captured image as an image data form.

In the step S2605, the controller 180 performs a capture operation for a part of the prescribed page and stores a captured image as a text form.

In the steps S2604 and the step S2605, if the capture operation is performed in response to the first gesture or the second gesture, the part of the prescribed page may correspond to a rectangular including a diagonal corresponding to a line crossing the first point and the second point.

In the steps S2604 and the step S2605, if the capture operation is performed in response to the third gesture, the part of the prescribed page may correspond to the whole of the prescribed page.

Advantages and effectiveness of a mobile terminal according to the present invention and a method of controlling therefor are explained in the following.

Advantages and effectiveness of a mobile terminal according to the present invention and a method of controlling therefor are explained in the following.

According to at least one of embodiments of the present invention, a wearable mobile terminal of a glasses form can be easily controlled by a gesture of a user.

And, according to at least one of embodiments of the present invention, if a user reads a printout while wearing a wearable device of a glasses form, multimedia content using an augmented reality can be additionally added to content of the printout and a user can read the multimedia content.

It will be apparent to those skilled in the art that the present invention can be specified into other form(s) without departing from the spirit or scope of the inventions.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrierwave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A wearable mobile terminal, comprising:
   a frame;
   a sensor located at a side of the frame and detecting a hand gesture of a user;
   a camera located at the side of the frame facing a gaze direction of the user; and
   if a gesture for a printout is detected via the sensor, a controller configured to control the camera to take a picture of a captured image for the printout, capture a page area of the printout designated by the gesture and output a pop-up window including selection icons,
   wherein if one of the selection icons is selected, the controller is further configured to store the captured page area of the printout based on a data type corresponding to the selected selection icon.

2. The wearable mobile terminal of claim 1, further comprising a memory,
   wherein the printout contains at least one printed text, and
   wherein the controller is configured to store the at least one printed text contained in the capture image in the memory in a text data form.

3. The wearable mobile terminal of claim 1, further comprising a memory,
   wherein the gesture contains an input designating a first point and a second point of the printout, and
   wherein the controller is configured to control the memory to store a rectangular area containing a diagonal corresponding to a line connecting the designated first point and the second point among the capture image taken.

4. The wearable mobile terminal of claim 3, wherein the gesture corresponds to touching the first point by a finger of the user and then dragging to the second point while the touch is maintained.

5. The wearable mobile terminal of claim 3, wherein the gesture corresponds to touching the first point by a finger of a hand of the user and touching the second point by a finger of a different hand of the user.

6. The wearable mobile terminal of claim 1, further comprising a memory, wherein the printout corresponds to a cover of a book, and
   wherein the controller is configured to control the memory to store a title of the book recognized based on the capture image.

7. The wearable mobile terminal of claim 6, wherein the gesture corresponds to either covering the cover of the book with a palm of the user or sweeping edges of the cover of the book diagonally facing each other.

8. The wearable mobile terminal of claim 1, further comprising a memory,
   wherein the printout contains a text in which a title of at least one book is printed,
   wherein the gesture corresponds to underlining a text in which a title of a book is printed, and
   wherein the controller is configured to control the memory to store the title of the book recognized based on the capture image.

9. The wearable mobile terminal of claim 1, further comprising a display,
   wherein the printout contains a text in which at least one word is printed,
   wherein the gesture corresponds to drawing a pattern on a text in which a word is printed using an object, and
   wherein the controller is configured to control the display to output a search result of the word recognized based on the capture image.

10. The wearable mobile terminal of claim 1, further comprising a memory,
    wherein the gesture corresponds to inputting a writing memo in the printout using an object, and
    wherein the controller is configured to control the memory to store the writing memo based on the capture image.

11. The wearable mobile terminal of claim 1, wherein the sensor is configured to detect the hand gesture of the user based on a plurality of images periodically captured by the camera.

12. A method of controlling a wearable mobile terminal, the method comprising:
    detecting a hand gesture of the user via a sensor;
    capturing, via a camera, a page area of a printout designated by the gesture if a gesture for the printout is detected and outputting a pop-up window including selection icons; and
    storing the captured page area of the printout based on a data type corresponding the selected selection icon if one of the selection icons is selected.

13. The method of claim 12, wherein the printout contains at least one printed text, and
    wherein the method further comprises storing the at least one printed text contained in the capture image in the memory in a text data form.

14. The method of claim 12, wherein the prescribed gesture contains an input designating a first point and a second point of the printout, and
    wherein the method further comprises controlling the memory to store a rectangular area containing a diagonal corresponding to a line connecting the designated first point and the second point among the capture image taken.

15. The method of claim 14, wherein the gesture corresponds to touching the first point by a finger of the user and then dragging to the second point while the touch is maintained.

16. The method of claim 14, wherein the gesture corresponds to touching the first point by a finger of a hand of the user and touching the second point by a finger of a different hand of the user.

17. The method of claim 12, wherein the printout corresponds to a cover of a book, and
    wherein the method further comprises controlling the memory to store a title of the book recognized based on the capture image.

18. The method of claim 17, wherein the gesture corresponds to either covering the cover of the book with a palm of the user or sweeping edges of the cover of the book diagonally facing each other.

19. The method of claim 12, wherein the printout contains a text in which a title of at least one book is printed,
    wherein the gesture corresponds to underlining a text in which a title of a book is printed, and
    wherein the method further comprises controlling the memory to store the title of the book recognized based on the capture image.

20. The method of claim 12, wherein the wearable device further comprises a display,
- wherein the printout contains a text in which at least one word is printed,
- wherein the gesture corresponds to drawing a pattern on a text in which a word is printed using an object, and
- wherein the method further comprises controlling the display to output a search result of the word recognized based on the capture image.

21. The method of claim 12, wherein the gesture corresponds to inputting a writing memo in the printout using an object, and
- wherein the method further comprises controlling the memory to store the writing memo based on the capture image.

22. The method of claim 12, wherein the detecting corresponds to detection of the hand gesture of the user based on a plurality of images periodically captured by the camera.

* * * * *